US011716731B2

(12) United States Patent
Chen

(10) Patent No.: US 11,716,731 B2
(45) Date of Patent: Aug. 1, 2023

(54) WIRELESS RESOURCE SCHEDULING

(71) Applicant: New H3C Technologies Co., Ltd., Zhejiang (CN)

(72) Inventor: Zhe Chen, Beijing (CN)

(73) Assignee: New H3C Technologies Co., Ltd., Zhejiang (CN)

( * ) Notice: Subject to any disclaimer, the term of this patent is extended or adjusted under 35 U.S.C. 154(b) by 91 days.

(21) Appl. No.: 17/042,733

(22) PCT Filed: Mar. 29, 2019

(86) PCT No.: PCT/CN2019/080615
§ 371 (c)(1),
(2) Date: Sep. 28, 2020

(87) PCT Pub. No.: WO2019/185055
PCT Pub. Date: Oct. 3, 2019

(65) Prior Publication Data
US 2021/0022164 A1 Jan. 21, 2021

(30) Foreign Application Priority Data
Mar. 29, 2018 (CN) .......................... 201810273913.9

(51) Int. Cl.
*H04W 72/21* (2023.01)
*H04L 5/00* (2006.01)
*H04W 72/23* (2023.01)

(52) U.S. Cl.
CPC .......... *H04W 72/21* (2023.01); *H04L 5/0048* (2013.01); *H04L 5/0082* (2013.01); *H04W 72/23* (2023.01)

(58) Field of Classification Search
CPC .......... H04W 72/1284; H04W 72/1289; H04L 5/0048; H04L 5/0082; H04L 5/0044; H04L 5/0092; H04L 5/1469; H04L 5/0007
See application file for complete search history.

(56) References Cited

U.S. PATENT DOCUMENTS

| 6,240,083 B1 | 5/2001 | Wright et al. |
| 2016/0182632 A1 | 6/2016 | Xu et al. |
| 2017/0164384 A1 | 6/2017 | Wang |
| 2018/0317256 A1 | 11/2018 | Um et al. |

(Continued)

FOREIGN PATENT DOCUMENTS

| CN | 102413576 A | 4/2012 |
| CN | 102640430 A | 8/2012 |

(Continued)

OTHER PUBLICATIONS

International Search Report dated Jun. 6, 2019, issued in connection with International Application No. PCT/CN2019/080615, filed on Mar. 29, 2019, 4 pages.

(Continued)

*Primary Examiner* — Justin T Van Roie
(74) *Attorney, Agent, or Firm* — McDonnell Boehnen Hulbert & Berghoff LLP

(57) ABSTRACT

The present disclosure relates to wireless resource scheduling, wherein network side equipment determines a transmission length type of a first channel and notifies the same to a UE, and the network side equipment and the UE perform data transmission within a target time unit based on the transmission length type of the first channel.

9 Claims, 12 Drawing Sheets

(56) References Cited

U.S. PATENT DOCUMENTS

2019/0182833 A1    6/2019  Li et al.
2020/0120701 A1*   4/2020  Peng ................. H04L 5/0094

FOREIGN PATENT DOCUMENTS

| CN | 105359481 A | 2/2016 |
|---|---|---|
| CN | 106231677 A | 12/2016 |
| CN | 106550465 A | 3/2017 |
| CN | 106954278 A | 7/2017 |
| CN | 108370297 A | 8/2018 |
| KR | 20010056132 A | 7/2001 |
| WO | 2015/013993 A1 | 2/2015 |
| WO | 2016/074250 A1 | 5/2016 |
| WO | 2017/098414 A1 | 6/2017 |
| WO | 2017/135674 A1 | 8/2017 |
| WO | 2017135026 A1 | 8/2017 |
| WO | 2018/031623 A1 | 2/2018 |
| WO | 2018/080260 A1 | 5/2018 |

OTHER PUBLICATIONS

Written Opinion dated Jun. 6, 2019, issued in connection with International Application No. PCT/CN2019/080615, filed on Mar. 29, 2019, 4 pages.

Catt, "Simultaneous PUCCH-PUSCH transmission in NR", 3GPP Draft, R1-1712408, 3rd Generation Partnership Project (3GPP), Aug. 20, 2017, 3 pages.

Samsung, "Resource Allocation for PUCCH transmission", 3GPP Draft, R1-1717655, 3rd Generation Partnership Project (3GPP), Oct. 8, 2017, 4 pages.

* cited by examiner

| Subframe Format | OFDM Symbols | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | D | D | X | D | D | D | D | D | D | X |
| 47 | D | D | D | D | D | X | X | D | D | D | D | D | X | X |
| 48 | D | D | X | X | X | X | X | D | X | X | X | X | X | X |
| 49 | D | X | X | X | X | X | X | D | X | X | X | X | X | X |
| 50 | X | U | U | U | U | U | U | X | U | U | U | U | U | U |
| 51 | X | X | U | U | U | U | U | X | X | U | U | U | U | U |
| 52 | X | X | X | U | U | U | U | X | X | X | U | U | U | U |
| 53 | X | X | X | X | U | U | U | X | X | X | X | U | U | U |
| 54 | D | D | D | D | D | X | U | D | D | D | D | D | X | U |
| 55 | D | D | X | D | D | D | U | D | D | X | U | U | U | U |
| 56 | D | X | U | U | U | U | U | D | X | U | U | U | U | U |
| 57 | D | D | D | D | X | X | U | D | D | D | D | X | X | U |
| 58 | D | D | X | X | U | U | U | D | D | X | X | U | U | U |
| 59 | D | X | X | U | U | U | U | D | X | X | U | U | U | U |
| 60 | D | X | X | X | X | X | U | D | X | X | X | X | X | U |
| 61 | D | D | X | X | X | X | U | D | D | X | X | X | X | U |

FIG. 2

WIRELESS RESOURCE SCHEDULING

CROSS-REFERENCE TO RELATED APPLICATIONS

The present application is a U.S. National Phase Application under 35 U.S.C. § 371 of International Application No. PCT/CN2019/080615 filed Mar. 29, 2019, which claims priority to Chinese patent application No. 201810273913.9, filed with the China National Intellectual Property Administration (CNIPA) on Mar. 29, 2018 and entitled "Wireless Resource Scheduling Method, Network Side Equipment and User Equipment", the disclosures of each of which are incorporated herein by reference in its their entirety.

BACKGROUND

In a conventional long term evolution (LTE) system of the 3rd Generation Partner Project (3GPP), data transmission between a base station and user equipment (UE) is generally achieved based on a time division duplexing (TDD) frame structure.

During the communication between the base station and the UE, the base station indicates the configured TDD frame structure to the UE in the cell, and communicates with the UE based on the configured TDD frame structure.

BRIEF DESCRIPTION OF DRAWINGS

In order to illustrate the technical solutions in examples of the present disclosure, brief introduction is made below on the drawings required to be used in the examples. It should be understood that the following drawings only illustrate some of the examples of the present disclosure and thus shall not be regarded as a limitation on the scope, and for a person of ordinary skills in the art, other related drawings may be obtained from these drawings without inventive effort.

FIG. 2 is a schematic diagram of 62 types of preset sub-frame formats.

DETAILED DESCRIPTION

In order for a person skilled in the art to better understand the technical solutions in the present disclosure, the relevant terms in the present disclosure will be explained first. For sake of simplicity and illustrative purposes, the present disclosure is mainly described in connection with the examples. In the following description, numerous specific details are set forth in order to enable the present disclosure to be understood thoroughly. However, it is apparent that the present disclosure may be applied without being limited to these specific details. In other instances, some methods and structures have not been described in detail to avoid unnecessarily obscuring the present disclosure. Throughout the present disclosure, the term "include" means "including, but not limited to", and the term "based on" means "based at least in part on"; and in addition, the terms "a/an" and "one" are intended to refer to at least one of the specific elements.

The network side equipment in the examples of the present disclosure may be a base station or other equipment with wireless resource scheduling capability on the network side, and user equipment (UE) may be any terminal equipment such as a mobile phone, a tablet computer, and a laptop computer.

Figure 1:
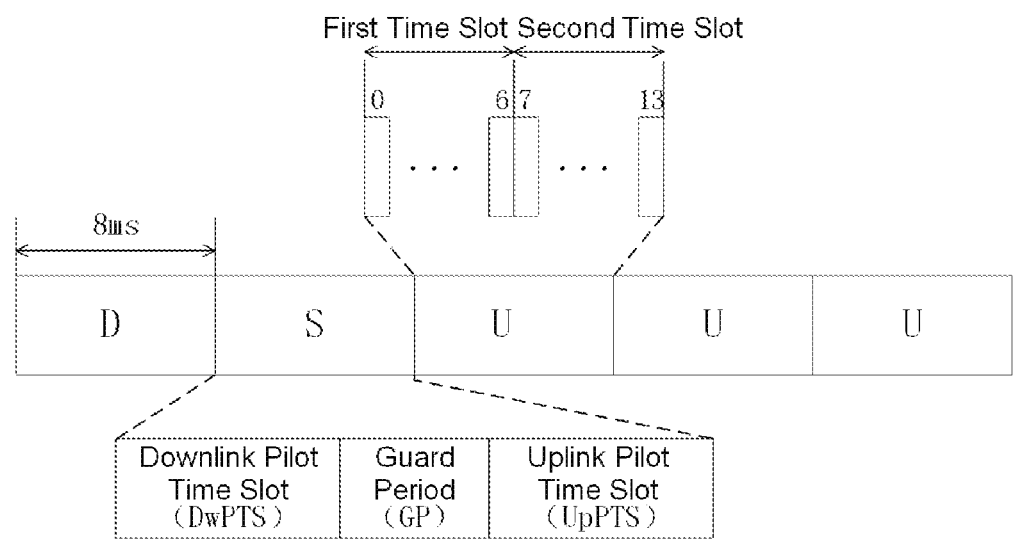
FIG. 1 is a schematic diagram of a TDD frame structure.

FIG. 1 is a schematic diagram of a TDD frame structure of a communication system of a wireless electric power private network, wherein D represents a downlink sub-frame for transmitting a downlink signal, S represents a special sub-frame, and U represents an uplink sub-frame for transmitting an uplink signal; and each sub-frame has a duration of 8 ms, one uplink sub-frame or one downlink sub-frame can each be divided into 2 time slots, and one special sub-frame includes 3 special time slots, i.e., a Downlink Pilot Time Slot (DwPTS), a Guard Period (GP) and an Uplink Pilot Time Slot (UpPTS). In addition, Orthogonal Frequency Division Multiplexing (OFDM) technique is used for data transmission in a Long Term Evolution (LTE) system, in which one time slot consists of 7 OFDM symbols.

In the frame structure as shown in FIG. 1, each sub-frame has a duration of 8 ms, and as can be seen, the round trip time for Hybrid Automatic Repeat Request (HARQ) of one downlink sub-frame will reach about 40 ms, wherein if retransmission is present, the transmission time will be multiplied. In order to shorten the round trip time of HARQ, in an example, uplink and downlink OFDM symbols may be simultaneously configured in one sub-frame, as shown in FIG. 2, the network side equipment first selects one sub-frame format from 62 types of preset sub-frame formats, and indicates the selected sub-frame format to the UE, thereby realizing data transmission between the UE and the base station. In this case, 6 bits are used by the network side equipment for indicating to the UE which one of the 62 types of preset sub-frame formats shall specifically be used.

In an example of the present disclosure, a wireless resource scheduling method is provided. As to the details thereof, reference may be made to the following description of examples.

Figure 3:
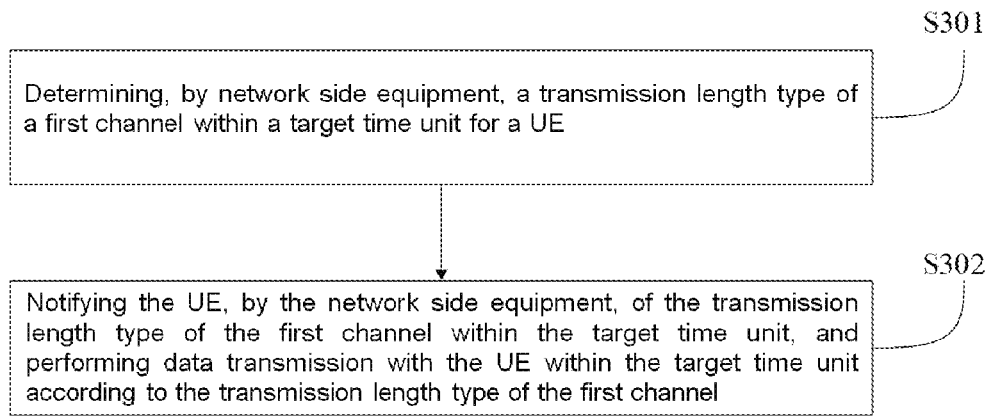
FIG. 3 is a flowchart of a wireless resource scheduling method provided by an example of the present disclosure.

FIG. 3 is a flowchart of a wireless resource scheduling method provided in an example of the present disclosure. The wireless resource scheduling method comprises:

At block S301: determining, by a network side equipment, a transmission length type of a first channel within a target time unit for user equipment (UE).

The target time unit here may be one sub-frame or one time slot, or a time unit length defined otherwise, e.g., a sub-frame group comprising two sub-frames. In an example, the first channel may be one of the following channels: a Physical Downlink Shared Channel (PDSCH), a Physical Uplink Control Channel (PUCCH), and a Physical Uplink Shared Channel (PUSCH).

It should be noted that the network side equipment may schedule, in the current time unit, the resources within the current time unit; the network side equipment may schedule, in the current time unit, the resources within any one or more future time units; and the network side equipment may schedule, in the current time unit, the resources within the current time unit and any one or more future time units. That is, the target time unit here may be the current time unit, a certain time unit in future, or a combination of the current time unit and a future time unit.

At block S301, the network side equipment determines the transmission length type of the first channel within the target time unit for the UE based on the need of data transmission with the UE. In an example, two transmission length types i.e., a long type and a short type, are defined. In an example, if one type of channel data needs to be transmitted in one time unit and the amount of data to be transmitted is relatively large, the long type may be used, and if two or more types of channel data need to be transmitted in one time unit and the amount of data transmitted via each type of channel is relatively small, the short type may be used. For example, if PDSCH transmission and PUCCH transmission are respectively performed in one time unit, the short type may be used. In an example of the present disclosure, three or more transmission length types may also be defined as needed. The transmission time length corresponding to each transmission length type may be predefined, or may be determined based on the length of the target time unit, and one or both of a first parameter value and a second parameter value. The first parameter value here indicates a minimum time length of the interval between a downlink signal and a subsequent uplink signal, and the second parameter value indicates a minimum time length of downlink transmission within the target time unit, wherein the downlink transmission starts at the starting position of the target time unit. As to the details, reference may be made to the description of the next example.

At block S302: notifying the UE, by the network side equipment, of the transmission length type of the first channel within the target time unit, and performing data transmission with the UE within the target time unit based on the transmission length type of the first channel.

Correspondingly, the UE receives the transmission length type of the first channel within the target time unit, with the transmission length type unit notified by the network side equipment, and performs data transmission with the network side equipment within the target time unit based on the transmission length type of the first channel.

In an example, the network side equipment may dynamically indicate the transmission length type by means of Downlink Control Information (DCI), and the transmission length type may specifically be indicated by a bit identifier. For example, when there are two transmission length types, bit identifiers 0 and 1 of 1 bit may be used to respectively indicate the long type and the short type. The network side equipment may perform data transmission with the UE on the first channel based on the transmission time length indicated by the transmission length type. In addition to the first channel, the network side equipment and the UE may also determine, based on the transmission length type and the channel type of the first channel, whether a transmission on a second channel exists. For example, if the first channel is a PDSCH and the transmission length type is the short type, the network side equipment and the UE may agree and set it as default that transmission on the PUCCH also exists, after the transmission time lengths in the number of the first parameter value elapse, and the transmission length type may be the short type.

Figure 4:
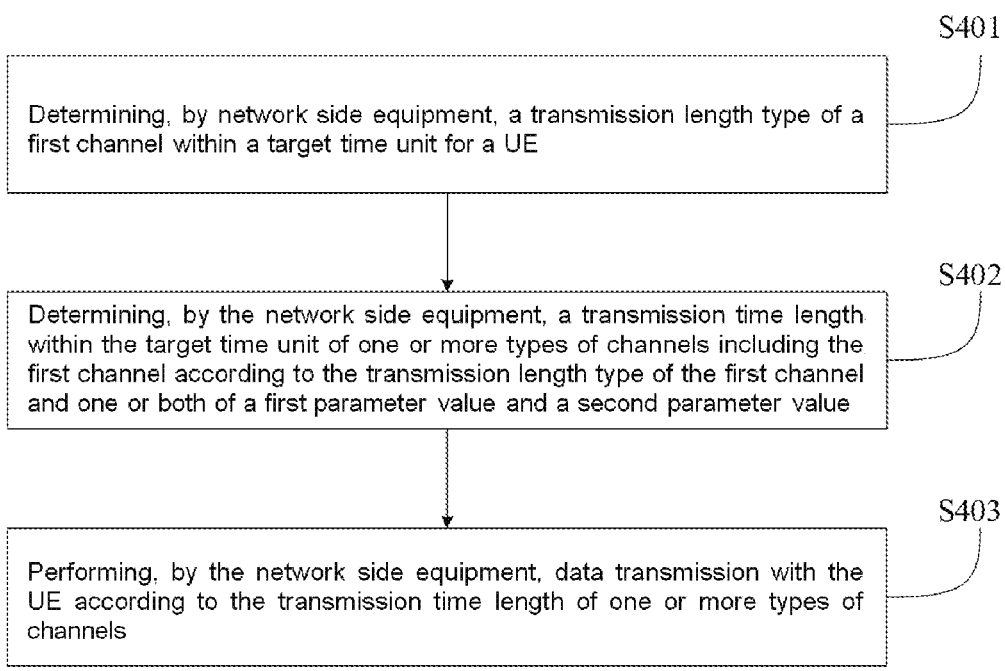
FIG. 4 is a flowchart of the wireless resource scheduling method provided by another example of the present disclosure.

FIG. 4 is a flowchart of the wireless resource scheduling method provided in another example of the present disclosure. The wireless resource scheduling method comprises:

At block S401: determining, by a network side equipment, a transmission length type of a first channel within a target time unit for a UE.

At block S402: determining, by the network side equipment, a transmission time length within the target time unit of one or more types of channels including the first channel based on the transmission length type of the first channel and one or both of a first parameter value and a second parameter value.

Here, for different channel types, different calculation formulas of the transmission time lengths are used. The network side equipment may determine the transmission time length within the target time unit of one or more types of channels including the first channel based on one or both of the first parameter value and the second parameter value, the transmission length type of the first channel, and the channel type of the first channel (such as PDSCH, PUCCH and PUSCH described in the following).

1) If the first channel is a physical downlink shared channel (PDSCH), the next time unit following the target time unit is for downlink, and the transmission length type of the PDSCH is the long type, it is determined that within the target time unit, the transmission time length of the PDSCH=the length of the target time unit−the second parameter value−$\alpha_1$, wherein $\alpha_1$ is a constant greater than or equal to 0, and the length of the PDSCH may be adjusted based on $\alpha_1$ so as to be adapted to different service conditions; wherein the transmission time length of the PDSCH of the long type is greater than the length of the target time unit/2.

Here, the length of the target time unit is an integer multiple of a base time. For example, taking one OFDM symbol as the base time, the length of the target time unit is N OFDM symbols, if one sub-frame is one time unit, N=14, and if one time slot is one time unit, N=7.

Figure 5:
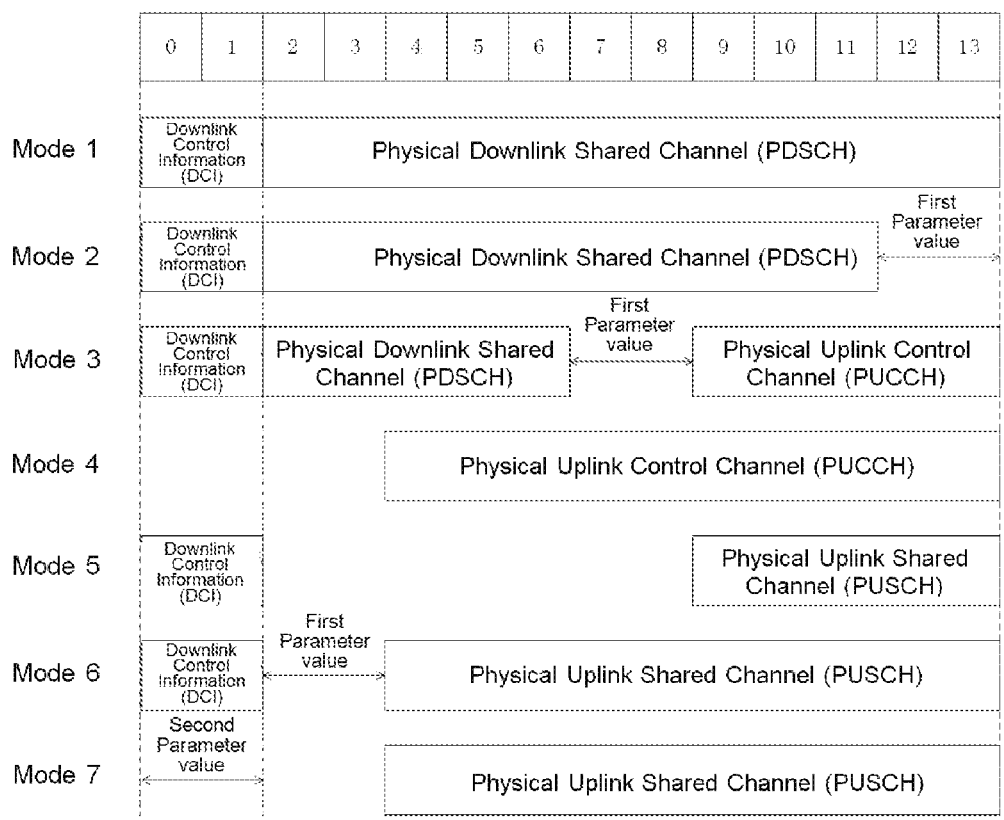
FIG. 5 illustrates an example of a transmission mode for scheduling within one sub-frame provided by an example of the present disclosure.

Taking the case where the time unit is one sub-frame as an example, as shown in FIG. 5, the first parameter value=2 (the number of OFDM symbols), the second parameter value=2, $\alpha_1$=0. In mode 1, one channel type is transmitted in one time unit, the transmitted channel type is PDSCH, in a known frame structure, the next sub-frame following the current sub-frame is for downlink, the transmission length type is the long type, in this case, the transmission time length of the PDSCH=14−2−0=12.

Here, the transmitted channel type may be directly indicated by the downlink control information (DCI), or the UE may determine the channel type based on the number of bits of a DCI load, since a different channel type corresponds to a DCI load having a different number of bits, and in this case, the channel type is determined by an indirect indication by means of the DCI. In an example, since the transmission channel following the PDSCH is PUCCH, the PUCCH can be determined based on the previous channel type, the PDSCH and the PUSCH, however, need to be distinguished. In the above, the two different channel types may be indicated by different bit identifiers in the DCI, or may not be indicated in the DCI, but determined by the UE based on the number of bits occupied for downlink decoding.

In addition, a determination as to whether the transmission type of the next time unit following the target time unit is for uplink or downlink may be made based on the time division duplexing (TDD) frame structure for data transmission between the network side equipment and the UE, and the TDD frame structure is configured by the network side equipment for the UE(s) in the cell.

As can be known from the above description, the network side equipment can indicate to the UE the uplink and downlink configuration mode within the target time unit by using one single bit. For example, 1 bit is used in the DCI to indicate to the UE the transmission length type of the channel within the target time unit, and based on the transmission length type, in combination with the known first parameter value, second parameter value and frame structure, and the channel type determined by downlink decoding, the UE can determine the uplink and downlink configuration mode within the target time unit, so that the signaling cost is low.

2) If the first channel is a PDSCH, the next time unit following the target time unit is for uplink, and the transmission length type of the PDSCH is the long type, it is determined that within the target time unit, the transmission time length of the PDSCH=the length of the target time unit−the first parameter value−the second parameter value−$\alpha_1$.

Still taking the case where the time unit is one sub-frame as an example, as shown in FIG. 5, in mode 2, one channel type, i.e., the PDSCH, is transmitted in one time unit, and in the known frame structure, the next sub-frame of the current sub-frame is for uplink, and the transmission length type is the long type, in this case, the transmission time length of the PDSCH=14−2−2−0=10.

3) If the first channel is a physical downlink shared channel (PDSCH) and the transmission length type of the PDSCH is the short type, it is determined that within the target time unit, the transmission time length of the PDSCH of the short type=⌊the length of the target time unit/$\beta$⌋−the second parameter value−$\alpha_2$, and within the target time unit, the transmission time length of the physical uplink control channel (PUCCH) of the short type=⌈the length of the target time unit/$\beta$⌉−the first parameter value−$\alpha_2$; wherein $\beta$ is a constant greater than or equal to 2, and $\alpha_2$ is a constant greater than or equal to 0.

Here, $\beta$ is set to be greater than or equal to 2, so that transmission of two or more types of channels can be performed in one time unit. $\alpha_2$ may be the same as or different from $\alpha_1$ described above.

As shown in FIG. 5, in mode 3, two channel types are transmitted in one time unit, $\beta=2$, $\alpha_2=0$, the transmitted two channel types are PDSCH and PUCCH, the transmission length type is the short type, in this case, the transmission time length of the PDSCH=⌊14/2⌋−2−0=5; correspondingly, the transmission time length of the PUCCH=⌈14/2⌉−2−0=5. In mode 3, HARQ acknowledgement (ACK) information corresponding to the PDSCH may be fed back in the PUCCH of the current sub-frame.

4) If the first channel is a PUCCH and the transmission length type of the PUCCH is the long type, it is determined that within the target time unit, the transmission time length of the PUCCH=the length of the target time unit−the first parameter value−the second parameter value−$\alpha_1$, and the transmission time length of the PUCCH of the long type is greater than the length of the target time unit/2.

As shown in FIG. 5, in mode 4, one channel type is transmitted in one time unit, the transmitted channel type is PUCCH, the transmission length type is the long type, and the long type here may be indicated in the DCI of the previous sub-frame (such as the previous sub-frame of the current sub-frame) scheduling the current sub-frame. In the above, the above indication may be an explicit indication, i.e., it is indicated in the DCI of the previous sub-frame that the PUCCH in the current sub-frame is of the long type, or may be an implicit indication, for example, in the DCI of the previous sub-frame, it is just indicated that the PDSCH of the previous sub-frame of the current sub-frame is of the long type, and the network side equipment and the UE may agree that, corresponding to the PDSCH, the PUCCH for subsequent uplink feedback, is also of the long type. In this case, the transmission time length of the PUCCH=14−2−2−0=10. In mode 4, the PUCCH is scheduled by the DCI in the sub-frame preceding the current sub-frame. Based on mode 4, uplink feedback can be performed on the PDSCH information in modes 1 and 2. In addition, the uplink control information such as Channel State Information (CSI) and a Reference Signal (RS) may also be fed back.

5) If the first channel is a physical uplink shared channel (PUSCH) and the transmission length type of the PUSCH is the short type, it is determined that within the target time unit, the transmission time length of the PUSCH=⌈the length of the target time unit/$\beta$⌉−the first parameter value−$\alpha_2$, wherein $\alpha_2$ is a constant greater than or equal to 0, and the length of the PUSCH may be adjusted based on the $\alpha_2$.

As shown in FIG. 5, in mode 5, one channel type is transmitted in one time unit, the transmitted channel type is PUSCH, the transmission length type is the short type, and in this case, the transmission time length of the PUSCH=⌈14/2⌉−2−0=5.

6) If the first channel is a PUSCH and the transmission length type of the PUSCH is the long type, it is determined that within the target time unit, the transmission time length of the PUSCH=the length of the target time unit−the first parameter value−the second parameter value−$\alpha_1$, and the transmission time length of the PUSCH of the long type is greater than the length of the target time unit/2.

As shown in FIG. 5, in modes 6 and 7, one channel type is transmitted in one time unit, the transmitted channel type is PUSCH, the transmission length type is the long type, and in this case, the transmission time length of the PUSCH=14−2−2−0=10. The difference between mode 6 and mode 7 is that in mode 6, the PUSCH is scheduled by the DCI of the current sub-frame, while in mode 7, the PUSCH is scheduled by the DCI of the sub-frame preceding the current sub-frame.

At block S403: performing, by the network side equipment, data transmission with the UE based on the transmission time length of one or more types of channels.

Here, the network side equipment performs data transmission with the UE based on a predefined transmission starting position and the transmission time length of one or more types of channels given in any one of the above modes 1-7. For example, in modes 1-3, the transmission starting position of the PDSCH is the position where the DCI ends, the transmission starting position in mode 4 is: the first parameter value+the second parameter value+$\alpha_1$, and the transmission starting position in mode 5 is: the time unit length−⌈the length of the target time unit/β⌉+the first parameter value+$\alpha_2$, and the transmission starting positions in mode 6 and mode 7 is: the first parameter value+the second parameter value+$\alpha_1$.

Figure 6:
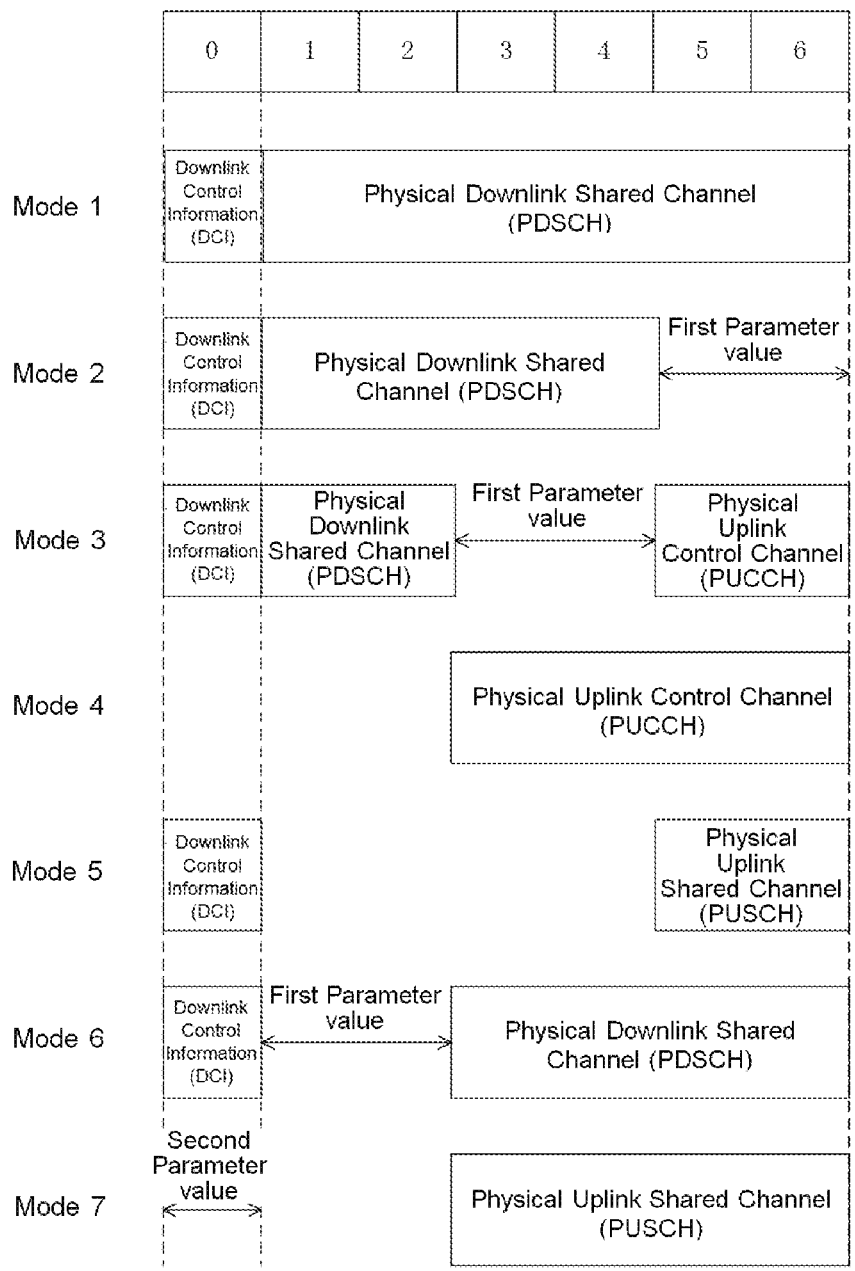
FIG. 6 illustrates an example of a transmission mode for scheduling within one time slot provided by an example of the present disclosure.

FIG. 5 illustrates an example in which the time unit is one sub-frame. In another example, the time unit is a time slot. As shown in FIG. 6, the first parameter value=2 (the number of OFDM symbols), the second parameter value=1, $\alpha_1$=0, in mode 1, the transmitted channel type is PDSCH, in the known frame structure, the next sub-frame of the current sub-frame is for downlink, the transmission length type is the long type, in this case, the transmission time length of the PDSCH=7−1−0=6. In mode 2, the transmitted channel type is PDSCH, in the known frame structure, the next sub-frame of the current sub-frame is for uplink, the transmission length type is the long type, and in this case, the transmission time length of the PDSCH=7−2−1−0=4. In mode 3, the transmitted channel types are PDSCH and PUCCH and the transmission length type is the short type, and in this case, the transmission time length of the PDSCH=⌊7/2⌋−1−0=2; and correspondingly, the transmission time length of the PUCCH=⌊7/2⌋−2−0=2. In mode 4, the transmitted channel type is PUCCH, the transmission length type is the long type, in this case, the transmission time length of the PUCCH=7−2−1−0=4; and in mode 4, the PUCCH is scheduled by the DCI in a time slot prior to the current time slot. In mode 5, the transmitted channel type is PUSCH, the transmission length type is the short type, in this case, the transmission time length of the PUSCH=⌊7/2⌋−2−0=2. In modes 6 and 7, the transmitted channel type is PUSCH, the transmission length type is the long type, and in this case, the transmission time length of the PUSCH=7−2−1−0=4.

In an example, the first parameter value and the second parameter value described above may be defined in a protocol, or may be indicated to the UE after being determined by the network side equipment. In addition, the network side equipment may also determine a value set of first parameters (the value set of first parameters may also be defined in the protocol), and then select a first parameter value for the UE from the value set. In the above, each first parameter value in the value set may have a bit identifier corresponding thereto. The network side equipment may send the bit identifier corresponding to the first parameter value to the UE, and the UE may determine the first parameter value simply based on the bit identifier, thereby saving the signaling cost. Similarly, the network side equipment may also determine a value set of second parameters (the value set of second parameters may also be defined in the protocol), then select a second parameter value from the value set, and send the bit identifier corresponding to the second parameter value to the UE, and the UE can determine the second parameter value only based on the bit identifier. As to the details, reference may be made to the description of the following example.

Figure 7:
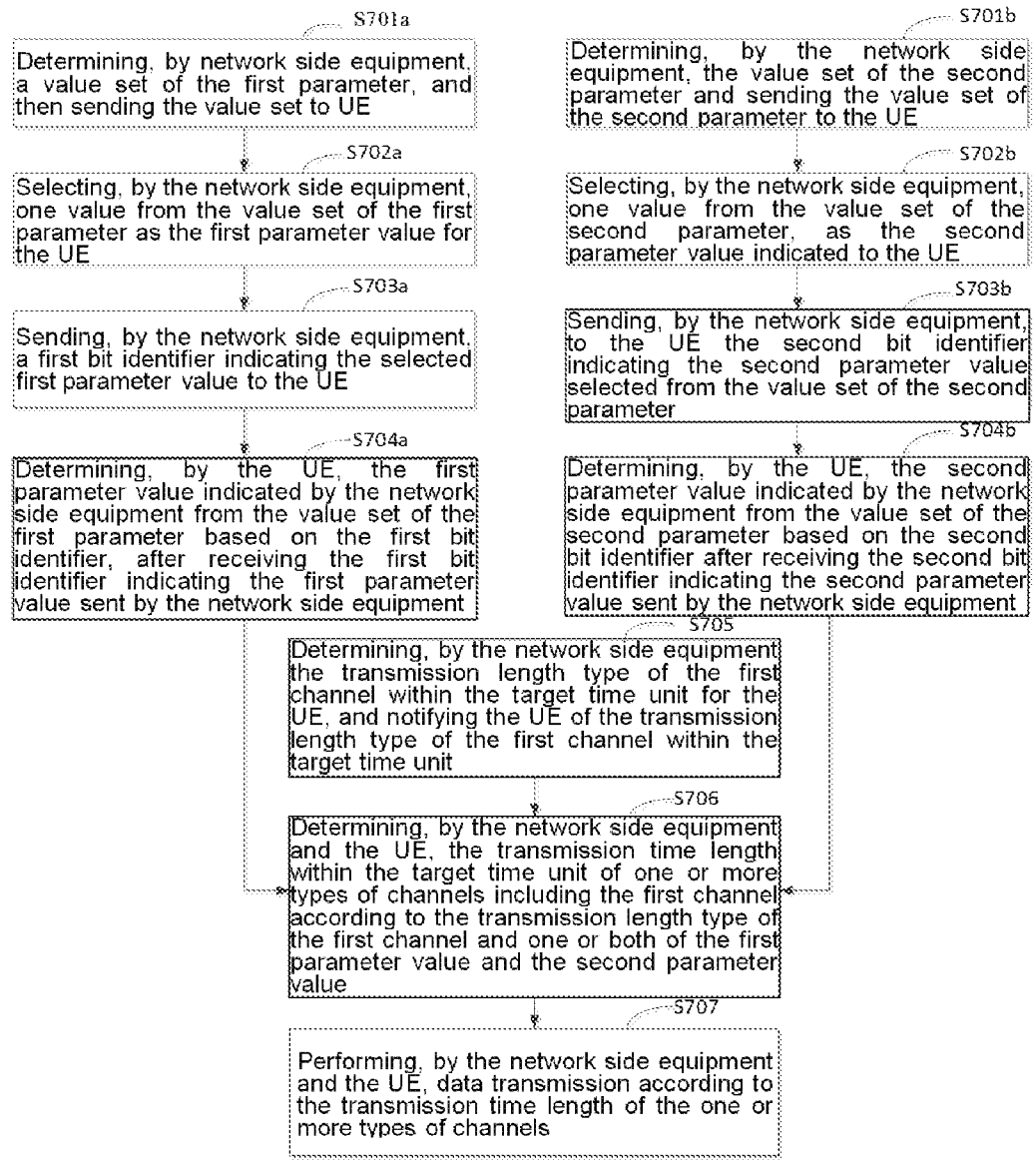
FIG. 7 is a flowchart of the wireless resource scheduling method provided by another example of the present disclosure.

FIG. 7 is a flowchart of the wireless resource scheduling method provided in another example of the present disclosure. The resource scheduling method comprises:

At block S701a: determining, by a network side equipment, a value set of first parameters, and then sending the value set to UE; wherein a first parameter is a parameter for indicating a minimum time length of an interval between a downlink signal and the immediately subsequent uplink signal.

Here, the network side equipment determining the value set of first parameters may refer to receiving a value set input by a network administrator, that is, the value set of first parameters may be preset empirically. In addition, the network side equipment may also determine the value set of first parameters based on a cell coverage distance and the counted processing time of each UE in the cell, and send the same to the UEs in the cell concurrently. The processing time of each UE includes at least one of the following: time required for receiving and decoding a downlink channel, time required for generating an uplink sending signal, and time required for switching from downlink receiving to uplink sending.

At block S702a: selecting, by the network side equipment, one value from the value set of first parameters as the first parameter value for the UE.

In an example, the network side equipment selects one value for the UE from the value set of first parameters based on the cell coverage distance and the processing time of the UE.

The UE here may be one UE, a group of UEs, or all the UEs within a cell. When configuring the first parameter value for a group of UEs or all the UEs within a cell collectively concurrently, the network side equipment may select a first parameter value for the group of UEs or the UEs within the cell based on the processing time of the UE with the lowest processing capability among the group of UEs or the UEs within the cell.

For example, for a group of UEs that do not vary greatly in processing capability, in an example of the present disclosure, a first parameter value may be selected for the group of UEs from the value set of first parameters, based on the cell coverage distance and the processing time of the UE with the lowest processing capability in the group of UEs. If different UEs or different groups of UEs vary greatly in processing capability, the network side equipment may select a first parameter value from the value set of first parameters for each UE or each group of UEs separately.

At block S703a: sending, by the network side equipment, a first bit identifier indicating the selected first parameter value to the UE.

Here, the network side equipment sends the first bit identifier to the above-described one UE, one group of UEs or UEs within the cell, and the one UE, one group of UEs or UEs within the cell determine(s) the first parameter value from the value set of first parameters based on the first bit identifier, as detailed in S704a.

At block S704a: determining, by the UE, the first parameter value indicated by the network side equipment from the value set of first parameters based on the first bit identifier, after receiving, from the network side equipment, the first bit identifier indicating the first parameter value.

For example, the decimal value set of first parameters is {1, 4, 7, 11}, the corresponding binary bit identifier set is {00, 01, 10, 11}, wherein the bit identifiers in the identifier set indicate the parameter values in the value set, respectively. The first parameter value selected by the network side equipment for the UE is decimal 11 (corresponding to binary 1011), and the first bit identifier corresponding to the first parameter value is determined to be binary 11. If the first parameter value is not indicated using the first bit identifier, it is also feasible to indicate the first parameter value using 4 bits.

At block S701b: determining, by the network side equipment, the value set of second parameters and sending the value set of second parameters to the UE.

The network side equipment may also determine a value set of second parameters for indicating "the minimum time length of downlink transmission within the target time unit, with the downlink transmission starting at the starting position of the target time unit". Here, the network side equipment determining the value set of second parameters may refer to receiving a value set input by the network administrator, that is, the value set may be preset empirically. In addition, the network side equipment may also obtain the value set by counting the number of symbols that each UE in the cell needs to occupy for transmitting the DCI and/or the number of symbols that each UE in the cell needs to occupy for transmitting downlink measurement reference signals, and concurrently send the value set of second parameters to the UEs in the cell, so as to facilitate the UEs to search for the corresponding second parameter value from the value set in a later stage after the UEs receive the second bit identifier indicated by the network side equipment.

At block S702b: selecting, by the network side equipment, one value from the value set of second parameters, as the second parameter value indicated to the UE.

Here, the network side equipment selects the second parameter value for the UE from the value set of second parameters based on the number of symbols that the current UE needs to occupy for transmitting the downlink control information (DCI) and/or the number of symbols that the current UE needs to occupy for transmitting the downlink measurement reference signals.

At block S703b: sending, by the network side equipment, to the UE the second bit identifier indicating the second parameter value selected from the value set of second parameters.

At block S704b: determining, by the UE, the second parameter value indicated by the network side equipment from the value set of second parameters based on the second bit identifier after receiving, from the network side equipment, the second bit identifier indicating the second parameter value.

For example, the decimal value set of second parameters is {0, 1, 2, 3} and the corresponding binary bit identifier set is {00, 01, 10, 11}, then for a second parameter value having a value of decimal number 3, the network side equipment just needs to indicate the binary number 11 in the above identifier set to the UE.

At block S705: determining, by the network side equipment, the transmission length type of the first channel within the target time unit for the UE, and notifying the UE of the transmission length type of the first channel within the target time unit.

At block S706: determining, by the network side equipment and the UE, the transmission time length within the target time unit of one or more types of channels including the first channel based on the transmission length type of the first channel and one or both of the first parameter value and the second parameter value.

At block S707: performing, by the network side equipment and the UE, data transmission based on the transmission time length of the one or more types of channels.

In the above examples, it has been explained that the first parameter value and the second parameter value may be predefined in a protocol, or may be notified to the UE after being determined by the network side equipment. As to the process of determining and delivering the first parameter value and the second parameter value by the network side equipment, more detailed description is made below by means of an example.

Figure 8:
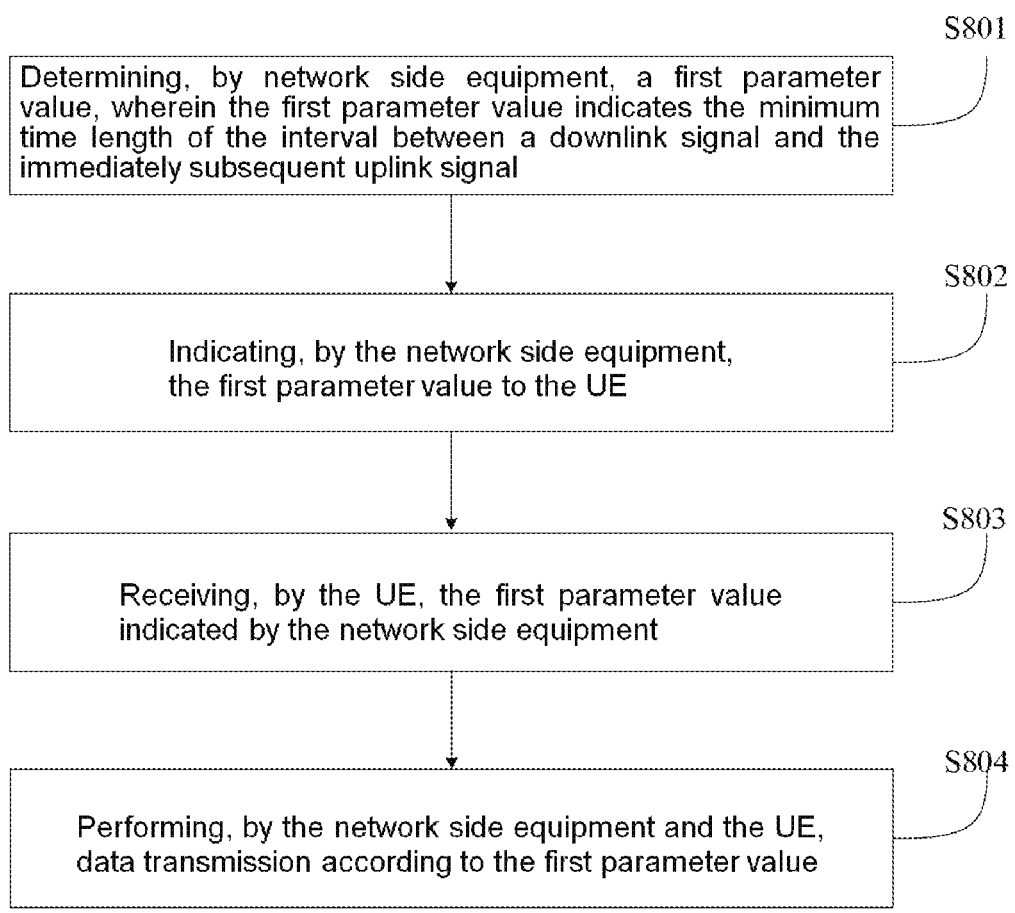
FIG. 8 is a flowchart of the wireless resource scheduling method provided by another example of the present disclosure.

FIG. 8 is a flowchart of the wireless resource scheduling method provided by another example of the present disclosure. The wireless resource scheduling method comprises:

At block S801: determining, by network side equipment, a first parameter value, wherein the first parameter value indicates a minimum time length of the interval between a downlink signal and the immediately subsequent uplink signal.

Here, in order to effectively isolate the downlink signal from the subsequent uplink signal to avoid crosstalk, an idle signal is set between the downlink signal and the immediately subsequent uplink signal, and the first parameter value indicates the minimum time length of the idle signal isolating the downlink signal from the immediately subsequent uplink signal. In an example, for the UE, when performing uplink signal feedback (PUCCH transmission) or uplink data transmission (PUSCH transmission), the idle time length of the interval between the time of uplink sending and the time of the previous downlink receiving may be greater than or equal to the first parameter value.

At block S802: indicating, by the network side equipment, the first parameter value to the UE.

In an example, the network side equipment determining the first parameter value at block S801 may refer to the network side equipment receiving the first parameter value input by a user, or refer to the network side equipment obtaining the first parameter value by automatic calculation and processing. In the case where the first parameter value is obtained by automatic calculation, the network side equipment may determine the first parameter value based on the cell coverage distance and the processing time of the UE. In the above, the cell coverage distance may refer to a coverage radius determined at the time of cell planning, e.g., 1.5 km. The processing time of the UE reflects the processing capability of the UE, and mainly includes one or more of the following three: the time required by the UE for receiving and decoding a downlink channel, the time required for generating an uplink sending signal, and the time required for switching from downlink receiving to uplink sending.

In addition, the network side equipment may configure the same first parameter value for a plurality of UEs in the cell, or configure different first parameter values for different UEs. For example, for a group of UEs that do not vary greatly in processing capability, in an example of the present disclosure, a first parameter value may be concurrently configured for the group of UEs based on the cell coverage distance. If different UEs or different groups of UEs vary greatly in processing capability, the network side equipment may configure a different first parameter value for each UE or each group of UEs.

In addition, the network side equipment may indicate the above first parameter value to the UE in the following one or more message forms:

a system message, a UE-Specific Higher-Layer Signaling, Cell-Specific Physical Layer Control Information, UE-group-Specific Physical Layer Control Information, and UE-Specific Physical Layer Control Information.

In the above, the system message may be sent in a broadcast manner; for example, in order to improve the reliability of information transmission, a UE-Specific Higher-Layer Signaling or UE-Specific Physical Layer Control Information (such as downlink control information (DCI)) may be used. Here, whether to use a higher-layer Signaling or a physical layer control information may be determined based on the time during which the UE expects to maintain the parameter value valid after receiving the first parameter value, wherein the higher-layer Signaling maintains the parameter value valid for a relatively long time, while the physical layer control information maintains the parameter value valid for a relatively short time. In the case of configuring a first parameter value for the UEs in the cell concurrently, the Cell-Specific Physical Layer Control Information may be used, and in the case of configuring a first parameter value for the groups of UEs in the cell concurrently, the UE-group-Specific Physical Layer Control Information may be used.

At block S803: receiving, by the UE, the first parameter value indicated by the network side equipment.

At block S804: performing, by the network side equipment and the UE, data transmission based on the first parameter value.

Here, the UE determines the minimum time length of the interval between the downlink signal and the immediately subsequent uplink signal based on the first parameter value indicated by the network side equipment. In an example where PUCCH transmission or PUSCH transmission is performed, the time length of the interval between the time of uplink sending and the time of previous downlink receiving may be controlled to be greater than or equal to the first parameter value. Furthermore, the network side equipment may also prepare for uplink receiving based on the above first parameter value.

In an example of the present disclosure, the value set of first parameters is also determined before the first parameter value is determined, and the value set of first parameters may be sent to the UE. The value set of first parameters may be sent to the UE using one or more of a system message, a UE-specific higher-layer signaling, cell-specific physical layer control information, UE-group-specific physical layer control information, and UE-specific physical layer control information.

In the above, in the examples of the present disclosure, the value set of first parameters may be set empirically, or the value set corresponding to the first parameter may be determined based on the cell coverage distance and the counted processing time interval of the UEs in the cell.

During data transmission, the network side equipment may select, based on the cell coverage distance and the processing time of the UE, a value from the value set of first parameters as the first parameter value indicated to the UE, and send to the UE a first bit identifier indicating the first parameter value. After receiving the first bit identifier, the UE may search for the first parameter value corresponding to the first bit identifier from the received value set of first parameters based on a predefined mapping rule. Here, the predefined mapping rule may be, for example, that the bit identifiers are sequentially arranged in ascending order of 00, 01, 10, 11 and correspond respectively to the parameter values arranged in ascending order in the value set of first parameters.

Optionally, while sending the value set of first parameters to the UE, the network side equipment may also send to the UE the mapping relation between the value set of first parameters and the bit identifiers. This approach may save signaling cost in the dynamic scheduling stage because the number of bits indicated by the bit identifier is usually smaller than the number of bits of the parameter values in the value set of first parameters.

In the examples of the present disclosure, not only the minimum time length of the interval between the downlink signal and the immediately subsequent uplink signal but also the minimum time length of downlink transmission can be flexibly configured. In an example, the wireless resource scheduling method may further comprise determining a second parameter value and indicating the second parameter value to the UE, wherein the second parameter value indicates the minimum time length of downlink transmission within one time unit, with the downlink transmission starting at the starting position of one time unit, as detailed in the following example.

Figure 9:
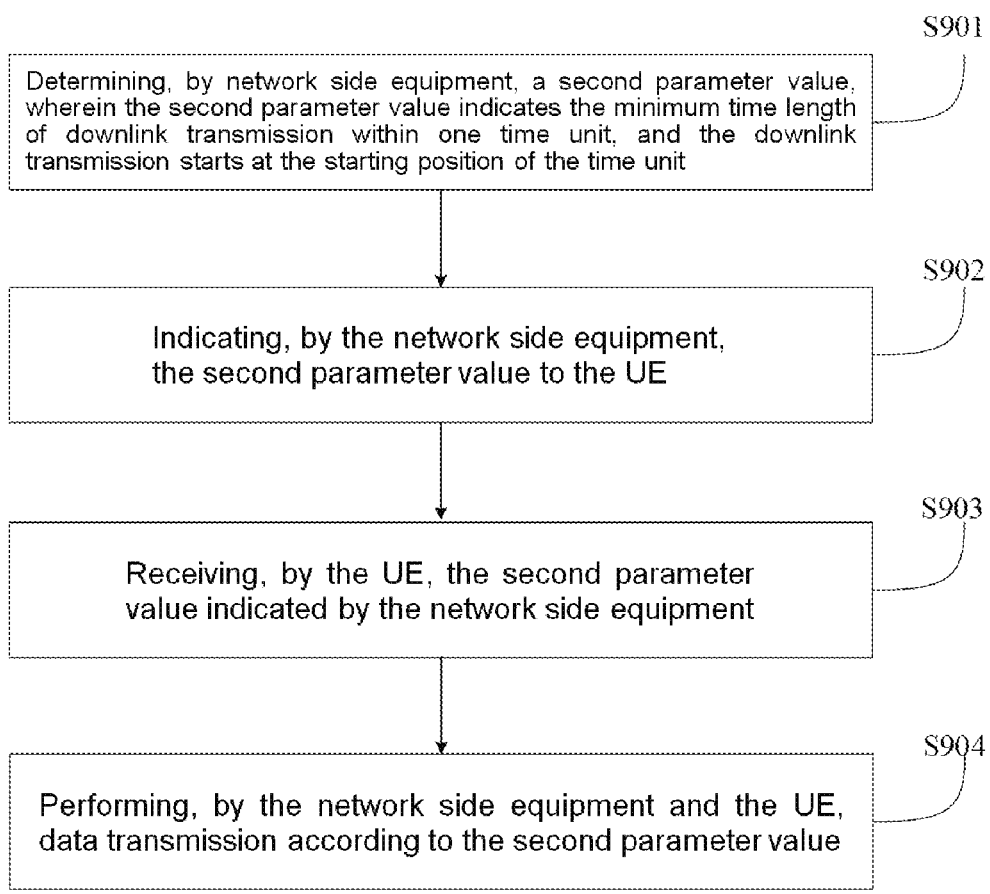
FIG. 9 is a flowchart of the wireless resource scheduling method provided by another example of the present disclosure.

FIG. 9 is a flowchart of the wireless resource scheduling method provided by another example of the present disclosure. The wireless resource scheduling method comprises:

At block S901: determining, by a network side equipment, a second parameter value, wherein the second parameter value indicates a minimum time length of downlink transmission within one time unit, and the downlink transmission starts at the starting position of the time unit.

Here, the network side equipment determining the second parameter value may refer to the network side equipment receiving the second parameter value input by the network administrator, or the network side equipment determining the second parameter value based on the number of symbols required to be occupied for transmitting the downlink control information (DCI) and the number of symbols required to be occupied for transmitting the downlink measurement reference signals, wherein the number of symbols may refer to the number of orthogonal frequency division multiplexing (OFDM) symbols.

At block S902: indicating, by the network side equipment, the second parameter value to the UE.

At block S903: receiving, by the UE, the second parameter value indicated by the network side equipment.

At block S904: performing, by the network side equipment and the UE, data transmission based on the second parameter value.

Here, the UE determines, based on the second parameter value indicated by the network side equipment, the minimum time length of downlink transmission in one subframe, one time slot or other time units, and during the dynamic scheduling stage, the length of transmission time occupied by the downlink signal may be greater than or equal to the above second parameter value.

In an example of the present disclosure, the network side equipment may also indicate the above second parameter value to the UE based on different message forms, for example, in the examples of the present disclosure, the second parameter value may also be indicated to the UE by one or more types of message forms: a system message, a UE-specific higher-layer signaling, cell-specific physical layer control information, UE-group-specific physical layer control information, and UE-specific physical layer control information.

In an example of the present disclosure, the value set of second parameters may be determined before the second parameter value is determined. The network side equipment determining the value set of second parameters may refer to the network side equipment receiving the value set of second parameters input by the network administrator, that is, the value set of second parameters may be defined empirically. In addition, the network side equipment may also determine the value set of second parameters based on the number of symbols that the UE needs to occupy for transmitting the DCI and/or the number of symbols that the UE needs to occupy for transmitting the downlink measurement reference signals. The network side equipment may select one second parameter value for one UE, or concurrently select one second parameter value for a group of UEs or all the UEs within a cell. In the case of concurrently selecting a second parameter value for a group of UEs or UEs within a cell, one value may be selected as the second parameter value from the value set of second parameters based on the maximum of the numbers of symbols that the UEs in the group or all the UEs in the cell need to occupy for transmitting the DCI and/or the maximum of the numbers of symbols that the UEs in the group or all the UEs in the cell need to occupy for transmitting downlink measurement reference signals.

In addition, after the value set of second parameters is determined, the value set may be sent to the UE. The value set of second parameters may be sent by one or more of a system message, a UE-specific higher-layer signaling, cell-specific physical layer control information, UE-group-specific physical layer control information, and UE-specific physical layer control information. When data transmission is required, the network side equipment may select one value from the value set of second parameters as the second parameter value indicated to the UE, and send to the UE a second bit identifier indicating the second parameter value. After receiving the second bit identifier, the UE searches the received value set of second parameters for the second parameter value corresponding to the second bit identifier from based on a predefined mapping rule. Here, the predefined mapping rule may be, for example, that the bit identifiers are sequentially arranged in ascending order of 00, 01, 10, 11 and correspond to the parameter values arranged in ascending order in the value set of second parameters, respectively. Optionally, while sending the value set of second parameters to the UE, the network side equipment may also send to the UE the mapping relation between the value set of second parameters and the bit identifiers. As can be seen, in the examples of the present disclosure, in addition to being defined in a protocol in a static manner, the above first parameter value and/or the second parameter value may also be determined by the network side equipment and then dynamically notified to the UE, or a semi-static manner may be used to predefine a value set, select a value from the value set for the UE, and dynamically indicate the same to the UE.

In the above-described example, the network side equipment may indicate the first parameter value and the second parameter value together to the UE, or indicate them separately. In the example below, the network side equipment may simultaneously indicate the first parameter value and the second parameter value to the UE.

Figure 10:
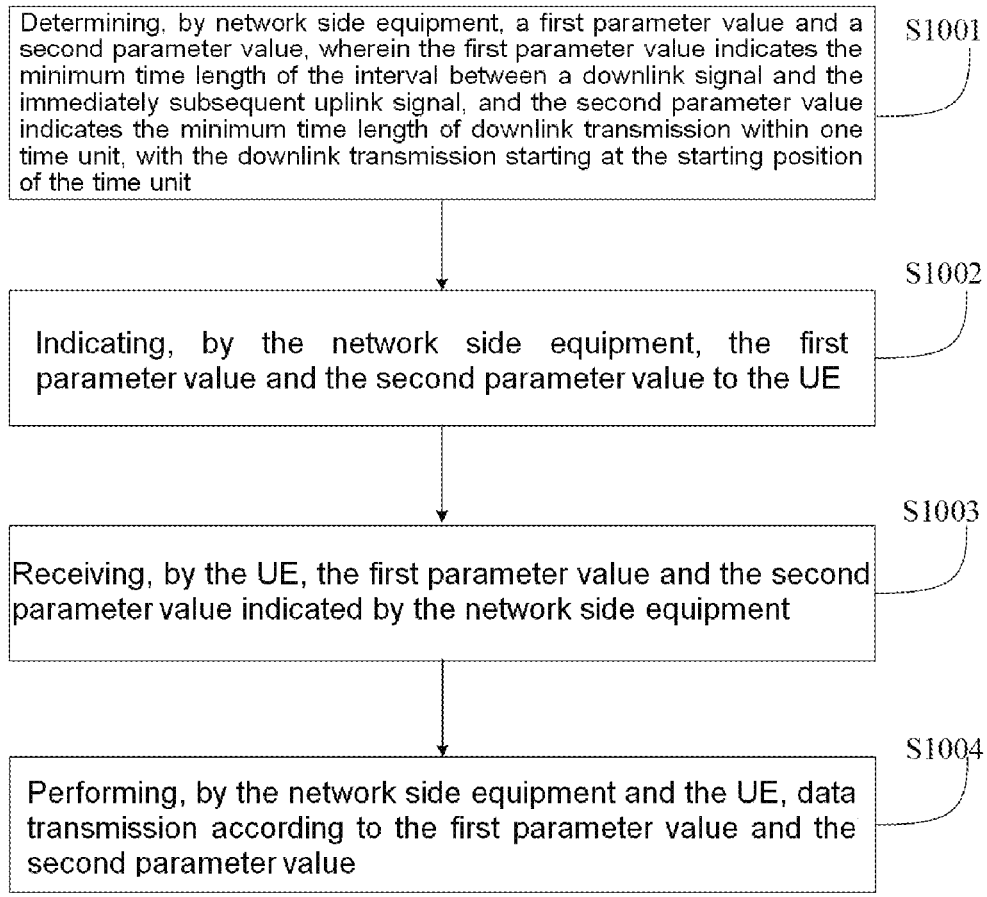
FIG. 10 is a flowchart of the wireless resource scheduling method provided by another example of the present disclosure.

FIG. 10 is a flowchart of the wireless resource scheduling method provided by another example of the present disclosure. The wireless resource scheduling method comprises:

At block S1001: determining, by a network side equipment, a first parameter value and a second parameter value, wherein the first parameter value indicates a minimum time length of the interval between a downlink signal and the immediately subsequent uplink signal, and the second parameter value indicates a minimum time length of downlink transmission within one time unit, with the downlink transmission starting at the starting position of the time unit;

At block S1002: indicating, by the network side equipment, the first parameter value and the second parameter value to the UE;

At block S1003: receiving, by the UE, the first parameter value and the second parameter value indicated by the network side equipment; and At block S1004: performing, by the network side equipment and the UE, data transmission based on the first parameter value and the second parameter value.

Here, in the examples of the present disclosure, the network side equipment may indicate the first parameter value and the second parameter value to the UE after determining the first parameter value and the second parameter value, and then the network side equipment and the UE may perform data transmission with each other based on the indicated first parameter value and second parameter value.

As to the manner in which the first parameter value and the second parameter value are determined and indicated, reference may be made to the description of the examples described above, and no more detailed description will be made here.

The present disclosure also provides examples of a wireless resource scheduling device corresponding to the wireless resource scheduling method, and examples of network side equipment and a UE. Since the problem-solving principle of the network side equipment and the UE in the examples of the present disclosure is similar to that of the wireless resource scheduling method in the examples of the present disclosure, as to the network side equipment and the UE, reference may be made to the examples of the method.

Figure 11:
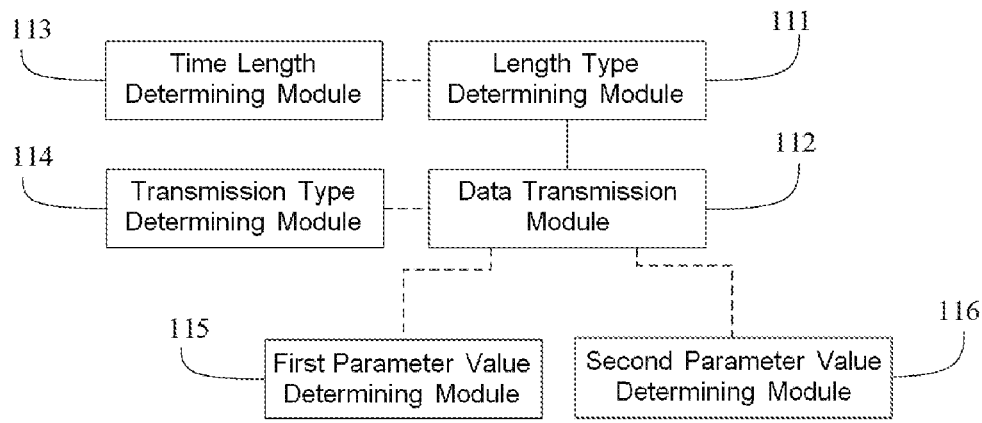
FIG. 11 is a schematic diagram of a wireless resource scheduling device provided by an example of the present disclosure.

FIG. 11 illustrates a wireless resource scheduling device provided by an example of the present disclosure, comprising:

a length type determining module 111 configured to determine a transmission length type of a first channel within a target time unit for UE; and a data transmission module 112 configured to notify the UE of the transmission length type of the first channel within the target time unit, and perform data transmission with the UE within the target time unit based on the transmission length type of the first channel.

Here, the above data transmission module 112 performing data transmission with the UE within the target time unit comprises:

determining a transmission time length within the target time unit of one or more channels including the first channel based on the transmission length type of the first channel, and one or both of a first parameter value and a second parameter value, wherein the first parameter value indicates a minimum time length of an interval between a downlink signal and an immediately subsequent uplink signal, and the second parameter value indicates a minimum time length of downlink transmission within the target time unit, with the downlink transmission starting at the starting position of the target time unit; and performing data transmission with the UE based on the transmission time length of the one or more channels.

In an example, the wireless resource scheduling device further comprises:

a time length determining module 113 configured to determine, if the first channel is a physical downlink shared channel (PDSCH), the next time unit following the target time unit is for downlink, and the transmission length type of the PDSCH is the long type, that within the target time unit, the transmission time length of the PDSCH=the length of the target time unit−the second parameter value−$\alpha_1$, with $\alpha_1$ being a constant greater than or equal to 0; wherein the transmission time length of the PDSCH of the long type is greater than the length of the target time unit/2;

determine, if the first channel is a PDSCH, the next time unit following the target time unit is for uplink, and the transmission length type of the PDSCH is the long type, that within the target time unit, the transmission time length of the PDSCH=the length of the target time unit−the first parameter value−the second parameter value−$\alpha_1$;

determine, if the first channel is a physical downlink shared channel (PDSCH) and the transmission length type of the PDSCH is the short type, that within the target time unit, the transmission time length of the PDSCH of the short type=⌊the length of the target time unit/β⌋−the second parameter value−$\alpha_2$, and within the target time unit, the transmission time length of the physical uplink control channel (PUCCH) of the short type=⌈the length of the target time unit/β⌉−the first parameter value−$\alpha_2$; wherein β is a constant greater than or equal to 2, and $\alpha_2$ is a constant greater than or equal to 0;

determine, if the first channel is a PUCCH and the transmission length type of the PUCCH is the long type, that within the target time unit, the transmission time length of the PUCCH=the length of the target time unit−the first parameter value−the second parameter value−$\alpha_1$, wherein the transmission time length of the PUCCH of the long type is greater than the length of the target time unit/2;

determine, if the first channel is a physical uplink shared channel (PUSCH) and the transmission length type of the PUSCH is the short type, that within the target time unit, the transmission time length of the PUSCH=⌈the length of the target time unit/β⌉−the first parameter value−$\alpha_2$; and determine, if the first channel is a PUSCH and the transmission length type of the PUSCH is the long type, that within the target time unit, the transmission time length of the PUSCH=the length of the target time unit−the first parameter value the second parameter value $\alpha_1$, wherein the transmission time length of the PUSCH of the long type is greater than the length of the target time unit/2.

Here, the dashed lines in the drawings illustrate that the time length determining module 113 may be connected with the length type determining module 111, representing that the time length determining module 113 may determine the transmission time length by acquiring the transmission length type from the length type determining module 111; moreover, the time length determining module 113 may be considered as a part of the data transmission module 112, or it may be construed that the data transmission module 112 may specifically realize calculation of the transmission time length by calling the time length determining module 113.

In an example, the wireless resource scheduling device further comprises:

a transmission type determining module 114 configured to determine a transmission type of the next time unit following the target time unit based on the time division duplexing (TDD) frame structure for data transmission between the network side equipment and the UE, with the transmission type being uplink or downlink.

In an example, the above wireless resource scheduling device further comprises:

a first parameter value determining module 115 configured to select, from a value set of the first parameter, one value as the first parameter value, and send to the UE a first bit identifier indicating the selected first parameter value; and a second parameter value determining module 116 configured to select, from a value set of second parameters, one value as the second parameter value based on the number of symbols required to be occupied for transmitting the downlink control information (DCI) and/or the number of symbols required to be occupied for transmitting the downlink measurement reference signals, and send to the UE a second bit identifier indicating the selected second parameter value.

In an example, the above data transmission module 112 notifying the UE of the transmission length type of the first channel within the target time unit according comprises:

sending a third bit identifier to the UE by means of the downlink control information (DCI), with the third bit identifier indicating the transmission length type of the first channel.

Figure 12:
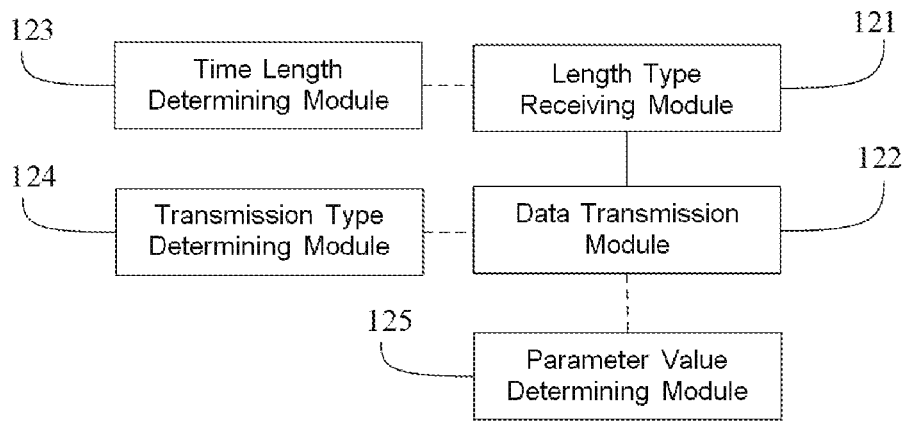
FIG. 12 is a schematic diagram of the wireless resource scheduling device provided by another example of the present disclosure.

FIG. 12 illustrates the wireless resource scheduling device provided by an example of the present disclosure, comprising:

a length type receiving module 121 configured to receive the transmission length type of the first channel within the target time unit, with the transmission length type notified by the network side equipment; and a data transmission module 122 configured to perform data transmission with the network side equipment within the target time unit based on the transmission length type of the first channel.

In an example, the data transmission module 122 performing data transmission with the network side equipment within the target time unit comprises:

determining a transmission time length within the target time unit of one or more channels including the first channel based on the transmission length type of the first channel and one or both of a first parameter value and a second parameter value, wherein the first parameter value indicates the minimum time length of the interval between a downlink signal and the immediately subsequent uplink signal, and the second parameter value indicates the minimum time length of downlink transmission within the target time unit, with the downlink transmission starting at the starting position of the target time unit; and performing data transmission with the network side equipment based on the transmission time length of the one or more channels.

In an example, the above wireless resource scheduling device further comprises:

a time length determining module 123 configured to determine, if the first channel is a physical downlink shared channel (PDSCH), the next time unit following the target time unit is for downlink, and the transmission length type of the PDSCH is the long type, that within the target time unit, the transmission time length of the PDSCH=the length of the target time unit−the second parameter value−$\alpha_1$, with $\alpha_1$ being a constant greater than or equal to 0; wherein the transmission time length of the PDSCH of the long type is greater than the length of the target time unit/2;

determine, if the first channel is a PDSCH, the next time unit following the target time unit is for uplink, and the transmission length type of the PDSCH is the long type, that within the target time unit, the transmission time length of the PDSCH=the length of the target time unit−the first parameter value−the second parameter value−$\alpha_1$;

determine, if the first channel is a physical downlink shared channel (PDSCH) and the transmission length type of the PDSCH is the short type, that within the target time unit, the transmission time length of the PDSCH of the short type=⌊the length of the target time unit/β⌋−the second parameter value−$\alpha_2$, and within the target time unit, the transmission time length of the physical uplink control channel (PUCCH) of the short type=⌈the length of the target time unit/β⌉−the first parameter value−$\alpha_2$; wherein β is a constant greater than or equal to 2, and $\alpha_2$ is a constant greater than or equal to 0;

determine, if the first channel is a PUCCH and the transmission length type of the PUCCH is the long type, that within the target time unit, the transmission time length of the PUCCH=the length of the target time unit−the first parameter value−the second parameter value−$\alpha_1$, wherein the transmission time length of the PUCCH of the long type is greater than the length of the target time unit/2;

determine, if the first channel is a physical uplink shared channel (PUSCH) and the transmission length type of the PUSCH is the short type, that within the target time unit, the transmission time length of the PUSCH=⌈the length of the target time unit/β⌉−the first parameter value−$\alpha_2$; and determine, if the first channel is a PUSCH and the transmission length type of the PUSCH is the long type, that within the target time unit, the transmission time length of the PUSCH=the length of the target time unit−the first parameter value−the second parameter value−$\alpha_1$, with $\alpha_1$ being a constant greater than or equal to 0; wherein the transmission time length of the PUSCH of the long type is greater than the length of the target time unit/2.

In an example, the above wireless resource scheduling device further comprises:

a transmission type determining module 124 configured to determine a transmission type of the next time unit following the target time unit based on the time division duplexing (TDD) frame structure for data transmission between the network side equipment and the wireless resource scheduling device.

In an example, the above wireless resource scheduling device further comprises:

a parameter value determining module 125 configured to determine from a value set of the first parameter, based on the first bit identifier, the first parameter value indicated by the network side equipment, after the wireless resource scheduling device receives a first bit identifier indicating the first parameter value sent by the network side equipment; and/or determine from a value set of second parameters, based on the second bit identifier, the second parameter value indicated by the network side equipment, after the wireless resource scheduling device receives a second bit identifier indicating the second parameter value sent by the network side equipment.

In an example, the length type receiving module 121 receiving the transmission length type of the first channel within the target time unit, with the transmission length type notified by the network side equipment comprises:

receiving the third bit identifier indicating the transmission length type of the first channel, with the third bit identifier sent by the network side equipment by means of the downlink control information (DCI).

Figure 13:
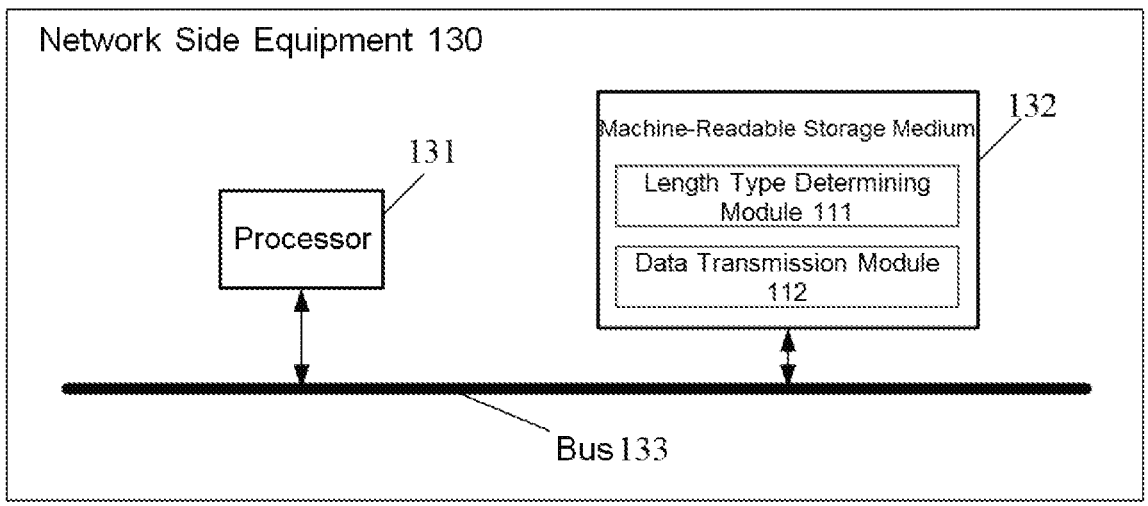
FIG. 13 is a schematic diagram of network side equipment provided by an example of the present disclosure.

As shown in FIG. 13, an example of the present disclosure also provides network side equipment 130, the network side equipment 130 comprises a processor 131, a machine-readable storage medium 132 and a bus 133, wherein machine-readable instructions executable by the processor are stored in the machine-readable storage medium 132, the processor communicates with the machine-readable storage medium via the bus, and when the machine-readable instructions are executed by the processor, the following processing is executed:

determining a transmission length type of a first channel within a target time unit for a UE; and notifying the UE of the transmission length type of the first channel within the target time unit, and performing data transmission with the UE within the target time unit based on the transmission length type of the first channel.

In an example, as for the performing data transmission with the UE based on the transmission length type of the first channel, when the machine-readable instructions are executed by the processor 131, the following processing is executed:

determining a transmission time length within the target time unit of one or more channels including the first channel based on the transmission length type of the first channel and one or both of a first parameter value and a second parameter value, wherein the first parameter value indicates the minimum time length of the interval between a downlink signal and the immediately subsequent uplink signal, and the second parameter value indicates the minimum time length of downlink transmission within the target time unit, with the downlink transmission starting at the starting position of the target time unit; and performing data transmission with the UE based on the transmission time length of the one or more channels.

In another example, as for the determining a transmission time length within the target time unit of one or more channels based on the transmission length type of the first channel and one or both of a first parameter value and a second parameter value, when the machine-readable instructions are executed by the processor 131, the following processing is executed:

determining, if the first channel is a physical downlink shared channel (PDSCH), the next time unit following the target time unit is for downlink, and the transmission length type of the PDSCH is the long type, that within the target time unit, the transmission time length of the PDSCH=the length of the target time unit−the second parameter value−$\alpha_1$, with $\alpha_1$ being a constant greater than or equal to 0; wherein the transmission time length of the PDSCH of the long type is greater than the length of the target time unit/2;

determining, if the first channel is a PDSCH, the next time unit following the target time unit is for uplink, and the transmission length type of the PDSCH is the long type, that within the target time unit, the transmission time length of the PDSCH=the length of the target time unit−the first parameter value−the second parameter value−$\alpha_1$;

determining, if the first channel is a physical downlink shared channel (PDSCH) and the transmission length type of the PDSCH is the short type, that within the target time unit, the transmission time length of the PDSCH of the short type=⌊the length of the target time unit/β⌋−the second parameter value−$\alpha_2$, and within the target time unit, the transmission time length of the physical uplink control channel (PUCCH) of the short type=⌈the length of the target time unit/β⌉−the first parameter value−$\alpha_2$; wherein β is a constant greater than or equal to 2, and $\alpha_2$ is a constant greater than or equal to 0;

determining, if the first channel is a PUCCH and the transmission length type of the PUCCH is the long type, that within the target time unit, the transmission time length of the PUCCH=the length of the target time unit−the first parameter value−the second parameter value−$\alpha_1$, wherein the transmission time length of the PUCCH of the long type is greater than the length of the target time unit/2;

determining, if the first channel is a physical uplink shared channel (PUSCH) and the transmission length type of the PUSCH is the short type, that within the target time unit, the transmission time length of the PUSCH=⌈the length of the target time unit/β⌉−the first parameter value−$\alpha_2$; and determining, if the first channel is a PUSCH and the transmission length type of the PUSCH is the long type, that within the target time unit, the transmission time length of the PUSCH=the length of the target time unit−the first parameter value−the second parameter value−$\alpha_1$, wherein the transmission time length of the PUSCH of the long type is greater than the length of the target time unit/2.

In an example, as for the determining the transmission type (being uplink or downlink) of the next time unit following the target time unit, when the machine-readable instructions are executed by the processor 131, the following processing is executed:

determining the transmission type of the next time unit following the target time unit based on the time division duplexing (TDD) frame structure for data transmission between the network side equipment 130 and the UE.

In yet another example, when the machine-readable instructions are executed by the processor 131, the following processing is further executed:

selecting, from a value set of the first parameter, one value as the first parameter value, and sending to the UE a first bit identifier indicating the selected first parameter value.

In yet another example, when the machine-readable instructions are executed by the processor 131, the following processing is further executed:

selecting, from a value set of second parameters, one value as the second parameter value based on the number of symbols required to be occupied for transmitting the downlink control information (DCI) and/or the number of symbols required to be occupied for transmitting the downlink measurement reference signals, and sending to the UE a second bit identifier indicating the selected second parameter value.

In another example, as for the notifying the UE of the transmission length type of the first channel within the target time unit, when the machine-readable instructions are executed by the processor 131, the following processing is executed:

sending a third bit identifier to the UE by means of the downlink control information (DCI), with the third bit identifier indicating the transmission length type of the first channel.

An example of the present disclosure also provides a computer-readable storage medium on which a computer program is stored, when the computer program is executed by the processor 131, the above functions of the network side equipment 130 as shown in FIG. 13 are executed.

Specifically, the storage medium may be a general-purpose storage medium such as a removable disk, a hard disk, or the like, and when the computer program on the storage medium is executed, the above-described wireless resource scheduling method may be executed, so as to solve the problem that the current wireless resource scheduling method is poor in flexibility, and further achieve the effect of flexible resource scheduling.

Figure 14:
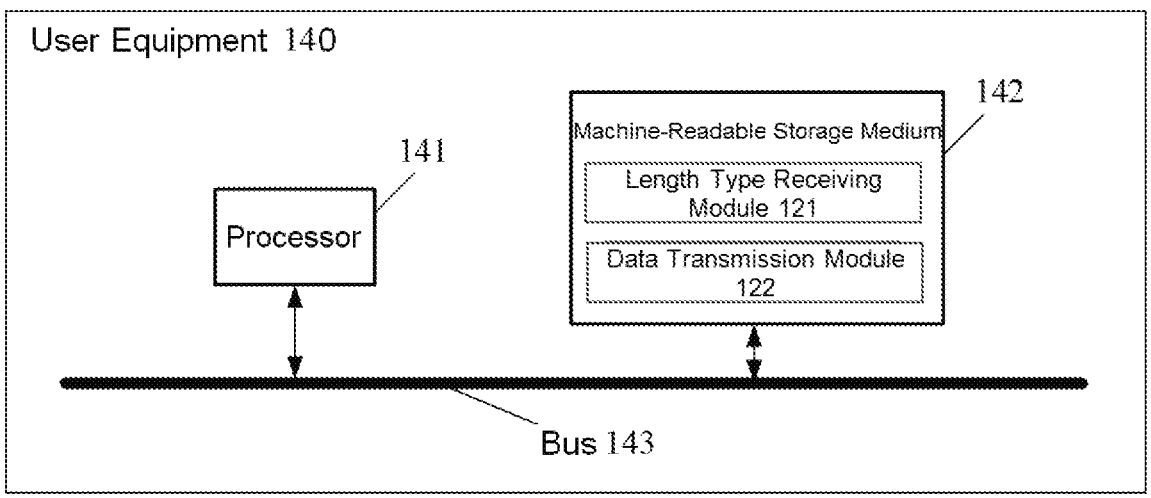
FIG. 14 is a schematic diagram of user equipment provided by an example of the present disclosure.

As shown in FIG. 14, an example of the present disclosure also provides user equipment 140, the user equipment 140 comprises a processor 141, a machine-readable storage medium 142 and a bus 143, wherein machine-readable instructions executable by the processor are stored in the machine-readable storage medium 142 storing, the processor 141 communicates with the machine-readable storage medium 142 via the bus 143, and when the machine-readable instructions are executed by the processor 141, the following is executed:

receiving the transmission length type of the first channel within the target time unit, with the transmission length type notified by the network side equipment; and performing data transmission with the network side equipment within the target time unit based on the transmission length type of the first channel.

In an example, as for the performing data transmission with the network side equipment within the target time unit based on the transmission length type of the first channel, when the machine-readable instructions are executed by the processor 141, the following processing is executed:

determining a transmission time length within the target time unit of one or more channels including the first channel based on the transmission length type of the first channel and one or both of a first parameter value and a second parameter value, wherein the first parameter value indicates the minimum time length of the interval between a downlink signal and the immediately subsequent uplink signal, and the second parameter value indicates the minimum time length of downlink transmission within the target time unit, with the downlink transmission starting at the starting position of the target time unit; and performing data transmission with the network side equipment based on the transmission time length of the one or more channels.

In another example, as for the determining a transmission time length within the target time unit of one or more channels based on the transmission length type of the first channel and one or both of a first parameter value and a second parameter value, when the machine-readable instructions are executed by the processor 141, the following processing is executed:

determining, if the first channel is a physical downlink shared channel (PDSCH), the next time unit following the target time unit is for downlink, and the transmission length type of the PDSCH is the long type, that within the target time unit, the transmission time length of the PDSCH=the length of the target time unit−the second parameter value−$\alpha_1$, with $\alpha_1$ being a constant greater than or equal to 0; wherein the transmission time length of the PDSCH of the long type is greater than the length of the target time unit/2;

determining, if the first channel is a PDSCH, the next time unit following the target time unit is for uplink, and the transmission length type of the PDSCH is the long type, that within the target time unit, the transmission time length of the PDSCH=the length of the target time unit−the first parameter value−the second parameter value−$\alpha_1$;

determining, if the first channel is a physical downlink shared channel (PDSCH) and the transmission length type of the PDSCH is the short type, that within the target time unit, the transmission time length of the PDSCH of the short type=⌊the length of the target time unit/$\beta$⌋−the second parameter value−$\alpha_2$, and that within the target time unit, the transmission time length of the physical uplink control channel (PUCCH) of the short type=⌈the length of the target time unit/$\beta$⌉−the first parameter value−$\alpha_2$; wherein $\beta$ is a constant greater than or equal to 2, and $\alpha_2$ is a constant greater than or equal to 0;

determining, if the first channel is a PUCCH and the transmission length type of the PUCCH is the long type, that within the target time unit, the transmission time length of the PUCCH=the length of the target time unit−the first parameter value−the second parameter value−$\alpha_1$, wherein the transmission time length of the PUCCH of the long type is greater than the length of the target time unit/2;

determining, if the first channel is a physical uplink shared channel (PUSCH) and the transmission length type of the PUSCH is the short type, that within the target time unit, the transmission time length of the PUSCH=⌈the length of the target time unit/$\beta$⌉−the first parameter value−$\alpha_2$; and determining, if the first channel is a PUSCH and the transmission length type of the PUSCH is the long type, that within the target time unit, the transmission time length of the PUSCH=the length of the target time unit−the first parameter value–the second parameter value–$\alpha_1$, with $\alpha_1$ being a constant greater than or equal to 0; wherein the transmission time length of the PUSCH of the long type is greater than the length of the target time unit/2.

In yet another example, when the machine-readable instructions are executed by the processor 141, the following processing is further executed:

determining the transmission type of the next time unit following the target time unit based on the time division duplexing (TDD) frame structure for data transmission between the network side equipment and the UE.

In another example, when the machine-readable instructions are executed by the processor 141, the following processing is further executed:

receiving a first bit identifier indicating the first parameter value sent by the network side equipment, and determining from a value set of the first parameter, based on the first bit identifier, the first parameter value indicated by the network side equipment; and/or receiving a second bit identifier indicating the second parameter value sent by the network side equipment, and determining from a value set of second parameters, based on the second bit identifier, the second parameter value indicated by the network side equipment.

In another example, as for the receiving the transmission length type of the first channel within the target time unit, with the transmission length type notified by the network side equipment, when the machine-readable instructions are executed by the processor 141, the following processing is executed:

receiving the third bit identifier indicating the transmission length type of the first channel, with the third bit identifier sent by the network side equipment by means of the downlink control information (DCI).

An example of the present disclosure also provides a computer-readable storage medium on which a computer program is stored, when the computer program is executed by the processor 141, the above functions of the user equipment 140 as shown in FIG. 14 are executed.

The storage medium may be a general-purpose storage medium such as a removable disk, a hard disk, or the like, and when the computer program on the storage medium is executed, the above-described wireless resource scheduling method may be executed, so as to solve the problem that the current wireless resource scheduling method is poor in flexibility, and further achieve the effect of flexible resource scheduling.

Figure 15:
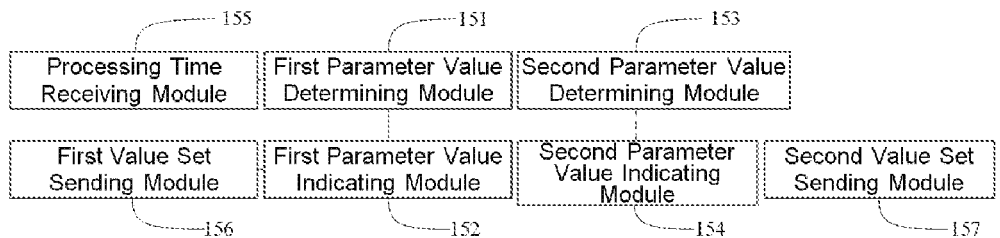
FIG. 15 is a schematic diagram of the wireless resource scheduling device provided by an example of the present disclosure.

FIG. 15 is a schematic diagram of the wireless resource scheduling device provided by an example of the present disclosure, comprising:

a first parameter value determining module 151 configured to determine a first parameter value, wherein the first parameter value indicates the minimum time length of the interval between a downlink signal and the immediately subsequent uplink signal; and a first parameter value indicating module 152 configured to indicate the first parameter value to the UE and perform data transmission with the UE based on the first parameter value.

In an example, the above wireless resource scheduling device also comprises:

a second parameter value determining module 153 configured to determine a second parameter value, wherein the second parameter value indicates the minimum time length of downlink transmission within the time unit, with the downlink transmission starting at the starting position of the time unit; and a second parameter value indicating module 154 configured to indicate the second parameter value to the UE.

In an example, the first parameter value determining module 151 determines the first parameter value based on one or more the following information:

a cell coverage distance; and processing time of the UE, including at least one of the following: time required for receiving and decoding a downlink channel, time required for generating an uplink transmission signal, and time required for switching from downlink reception to uplink transmission.

In an example, the first parameter value indicating module 152 indicates the first parameter value to the UE in one of the following message forms:

a system message, a UE-specific higher-layer signaling, cell-specific physical layer control information, UE-group-specific physical layer control information, and UE-specific physical layer control information.

In an example, the first parameter value indicating module 152 selects, from a value set of the first parameter, one value as the first parameter value indicated to the UE based on one or more of types of the following information:

a cell coverage distance; and processing time of the UE, including at least one of the following: time required for receiving and decoding a downlink channel, time required for generating an uplink transmission signal, and time required for switching from downlink reception to uplink transmission.

In an example, the above device also comprises:

a processing time receiving module 155 configured to receive the processing time reported by the UE.

In an example, the first parameter value indicating module 152 is configured to send to the UE a first bit identifier indicating the first parameter value selected from the value set of the first parameter.

In an example, the above wireless resource scheduling device also comprises:

a first value set sending module 156 configured to send the value set of the first parameter to the UE in one of the following message forms:

a system message, a UE-specific higher-layer signaling, cell-specific physical layer control information, UE-group-specific physical layer control information, and UE-specific physical layer control information.

In an example, the second parameter value determining module 153 determines the second parameter value based on the following step:

determining the second parameter value based on the number of symbols required to be occupied for transmitting the downlink control information (DCI) and/or the number of symbols required to be occupied for transmitting the downlink measurement reference signals.

In an example, the second parameter value indicating module 154 is configured to send the second parameter value to the UE in one of the following message forms:

a system message, a UE-specific higher-layer signaling, cell-specific physical layer control information, UE-group-specific physical layer control information, and UE-specific physical layer control information.

In another example, the second parameter value determining module 153 determines the second parameter value based on the following step:

selecting, based on the number of symbols required to be occupied for transmitting the downlink control information (DCI) and/or the number of symbols required to be occupied for transmitting the downlink measurement reference signals, one value from the value set of second parameters as the second parameter value indicated to the UE.

In an example, the second parameter value indicating module 154 is configured to:

send to the UE a second bit identifier indicating the second parameter value selected from the value set of second parameters.

In an example, the above wireless resource scheduling device also comprises:

a second value set sending module 157 configured to send the value set of second parameters to the UE in one of the following message forms:

a system message, a UE-specific higher-layer signaling, cell-specific physical layer control information, UE-group-specific physical layer control information, and UE-specific physical layer control information.

Figure 16:
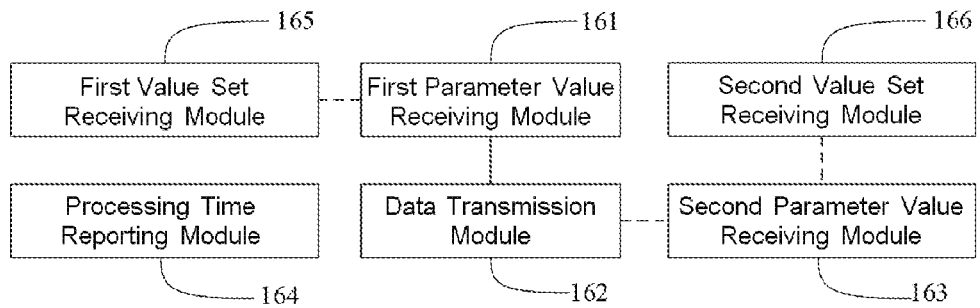
FIG. 16 is a schematic diagram of the wireless resource scheduling device provided by another example of the present disclosure.

FIG. 16 is a schematic diagram of the wireless resource scheduling device provided by another example of the present disclosure, comprising:

a first parameter value receiving module 161 configured to receive a first parameter value indicated by network side equipment, wherein the first parameter value indicates the minimum time length of the interval between a downlink signal and the immediately subsequent uplink signal; and a data transmission module 162 configured to perform data transmission with the network side equipment based on the first parameter value.

In an example, the above wireless resource scheduling device also comprises:

a second parameter value receiving module 163 configured to receive a second parameter value indicated by the network side equipment, wherein the second parameter value indicates the minimum time length of downlink transmission within the time unit, with the downlink transmission starting at the starting position of the time unit; and a data transmission module 162 configured to:

perform data transmission with the network side equipment based on the first parameter value and the second parameter value.

In an example, the above wireless resource scheduling device also comprises:

a processing time reporting module 164 configured to report processing time of the UE so that the network side equipment determines the first parameter value for the UE based on the processing time of the UE, wherein the processing time of the UE includes at least one of the followings:

time required by the UE for receiving and decoding a downlink channel, time required by the UE for generating an uplink transmission signal, and time required by the UE for switching from downlink reception to uplink transmission.

In an example, the first parameter value receiving module 161 is configured to receive the first parameter value in one of the following message forms:

a system message, a UE-specific higher-layer signaling, cell-specific physical layer control information, UE-group-specific physical layer control information, and UE-specific physical layer control information.

In an example, the first parameter value receiving module 161 is configured to: receive a first bit identifier indicating the first parameter value, with the first bit identifier sent by the network side equipment, and determine the first parameter value indicated by the network side equipment from a value set of the first parameter based on the first bit identifier.

In an example, the above wireless resource scheduling device also comprises:

a first value set receiving module 165 configured to receive the value set of the first parameter in one of the following message forms:

a system message, a UE-specific higher-layer signaling, cell-specific physical layer control information, UE-group-specific physical layer control information, and UE-specific physical layer control information.

In another example, the second parameter value receiving module 163 is configured to:

receive a second bit identifier indicating the second parameter value sent by the network side equipment, and determine from a value set of second parameters, based on the second bit identifier, the second parameter value indicated by the network side equipment.

In an example, the above wireless resource scheduling device also comprises:

a second value set receiving module 166 configured to receive the value set of second parameters in one of the following message forms:

a system message, a UE-specific higher-layer signaling, cell-specific physical layer control information, UE-group-specific physical layer control information, and UE-specific physical layer control information.

Figure 17:
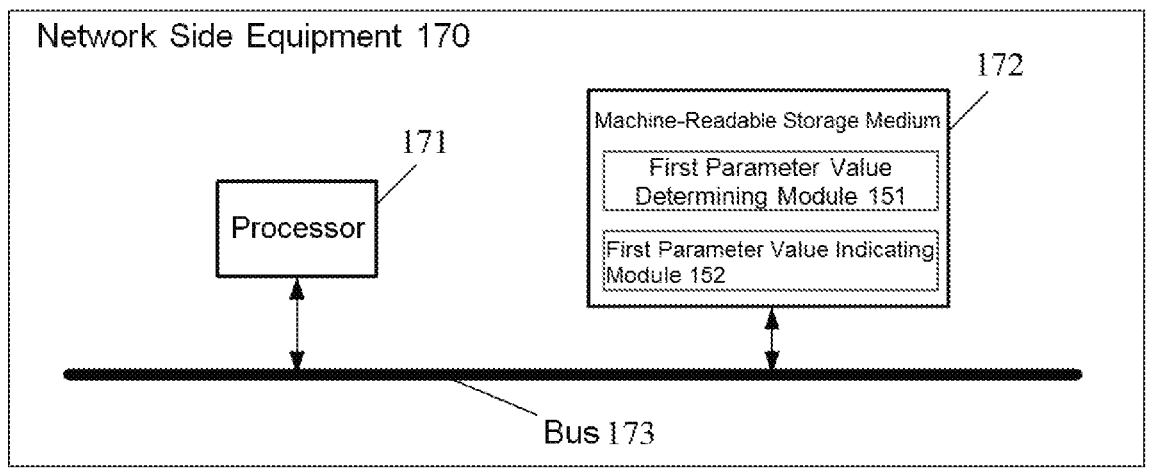
FIG. 17 is a schematic diagram of the network side equipment provided by another example of the present disclosure.

As shown in FIG. 17, an example of the present disclosure also provides network side equipment 170, the network side equipment 170 comprises a processor 171, a machine-readable storage medium 172 and a bus 173, wherein machine-readable instructions executable by the processor 171 are stored in the machine-readable storage medium 172, the processor 171 communicates with the machine-readable storage medium 172 via the bus 173, and when the machine-readable instructions are executed by the processor 171, the following processing is executed:

determining a first parameter value, wherein the first parameter value indicates the minimum time length of the interval between a downlink signal and the immediately subsequent uplink signal; and indicating the first parameter value to the UE, and performing data transmission with the UE based on the first parameter value.

In an example, when the machine-readable instructions are executed by the processor 171, the following processing is further executed:

determining a second parameter value, wherein the second parameter value indicates the minimum time length of downlink transmission within the time unit, with the downlink transmission starting at the starting position of the time unit; and indicating the second parameter value to the UE.

In an example, when the machine-readable instructions are executed by the processor 171, the following processing is executed:

determining the first parameter value based on one or more the following information: a cell coverage distance; and processing time of the UE, including at least one of the following: time required for receiving and decoding a downlink channel, time required for generating an uplink transmission signal, and time required for switching from downlink reception to uplink transmission.

In an example, when the machine-readable instructions are executed by the processor 171, the following processing is executed:

indicating the first parameter value to the UE in one of the following message forms:

a system message, a UE-specific higher-layer signaling, cell-specific physical layer control information, UE-group-specific physical layer control information, and UE-specific physical layer control information.

In another example, as for the determining the first parameter value, when the machine-readable instructions are executed by the processor 171, the following processing is executed:

selecting, from a value set of the first parameter, one value as the first parameter value indicated to the UE.

In yet another example, when the machine-readable instructions are executed by the processor 171, the following processing is executed:

selecting one value from a value set of the first parameter as the first parameter value indicated to the UE based on one or more the following information:

a cell coverage distance; and processing time of the UE, including at least one of the following: time required for receiving and decoding a downlink channel, time required for generating an uplink transmission signal, and time required for switching from downlink reception to uplink transmission.

In yet another example, when the machine-readable instructions are executed by the processor 171, the following processing is further executed:

receiving the processing time reported by the UE.

In another example, as for the indicating the first parameter value to the UE, when the machine-readable instructions are executed by the processor 171, the following processing is further executed:

sending to the UE a first bit identifier indicating the first parameter value selected from the value set of the first parameter.

In an example, when the machine-readable instructions are executed by the processor 171, the following processing is further executed:

sending the value set of the first parameter to the UE in one of the following message forms:

a system message, a UE-specific higher-layer signaling, cell-specific physical layer control information, UE-group-specific physical layer control information, and UE-specific physical layer control information.

In another example, when the machine-readable instructions are executed by the processor 171, the following processing is further executed:

determining the second parameter value based on the number of symbols required to be occupied for transmitting the downlink control information (DCI) and/or the number of symbols required to be occupied for transmitting the downlink measurement reference signals.

In an example, when the machine-readable instructions are executed by the processor 171, the following processing is further executed:

sending the second parameter value to the UE in one of the following message forms:

a system message, a UE-specific higher-layer signaling, cell-specific physical layer control information, UE-group-specific physical layer control information, and UE-specific physical layer control information.

In another example, when the machine-readable instructions are executed by the processor 171, the following processing is executed:

selecting one value from the value set of second parameters as the second parameter value indicated to the UE.

In an example, when the machine-readable instructions are executed by the processor 171, the following processing is executed:

selecting one value from the value set of second parameters as the second parameter value indicated to the UE based on the number of symbols required to be occupied for transmitting the downlink control information (DCI) and/or the number of symbols required to be occupied for transmitting the downlink measurement reference signals.

In a further example, when the machine-readable instructions are executed by the processor 171, the following processing is further executed:

sending the value set of second parameters to the UE: and sending to the UE a second bit identifier indicating the second parameter value selected from the value set of second parameters.

In an example, when the machine-readable instructions are executed by the processor 171, the following processing is executed:

sending the value set of second parameters to the UE in one of the following message forms:

a system message, a UE-specific higher-layer signaling, cell-specific physical layer control information, UE-group-specific physical layer control information, and UE-specific physical layer control information.

An example of the present disclosure also provides a computer-readable storage medium on which a computer program is stored, when the computer program is executed by the processor 171, the above functions of the network side equipment 170 as shown in FIG. 17 is executed.

The storage medium may be a general-purpose storage medium such as a removable disk, a hard disk, or the like, and when the computer program on the storage medium is executed, the above-described wireless resource scheduling method may be executed, so as to solve the problem that the current wireless resource scheduling method is poor in flexibility, and further achieve the effect of flexible resource scheduling.

Figure 18:
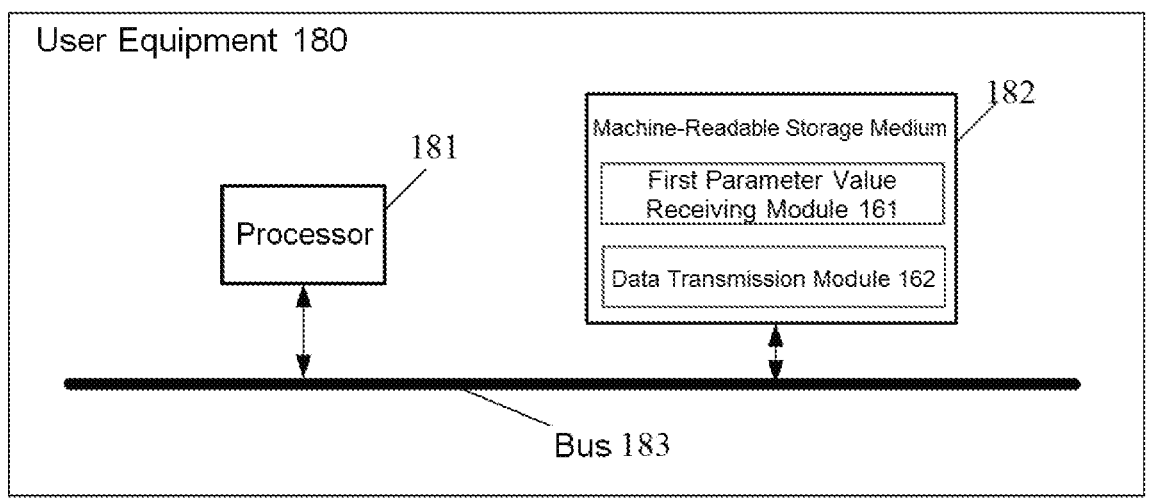
FIG. 18 is a schematic diagram of the user equipment provided by another example of the present disclosure.

As shown in FIG. 18, an example of the present disclosure also provides user equipment 180, the user equipment 180 comprises a processor 181, a machine-readable storage medium 182 and a bus 183, wherein machine-readable instructions executable by the processor 181 are stored in the machine-readable storage medium 182, the processor 181 communicates with the machine-readable storage medium 182 via the bus 183, and when the machine-readable instructions are executed by the processor 181, the following processing is executed:

receiving a first parameter value indicated by network side equipment, wherein the first parameter value indicates the minimum time length of the interval between a downlink signal and the immediately subsequent uplink signal; and performing data transmission with the network side equipment based on the first parameter value.

In an example, when the machine-readable instructions are executed by the processor 181, the following processing is further executed:

receiving a second parameter value indicated by the network side equipment, wherein the second parameter value indicates the minimum time length of downlink transmission within the time unit, with the downlink transmission starting at the starting position of the time unit; and performing data transmission with the network side equipment based on the first parameter value and the second parameter value.

In another example, when the machine-readable instructions are executed by the processor 181, the following processing is executed:

reporting processing time of the UE so that the network side equipment determines the first parameter value for the UE based on the processing time of the UE, wherein the processing time of the UE includes at least one of the followings:

time required by the UE for receiving and decoding a downlink channel, time required by the UE for generating an uplink transmission signal, and time required by the UE for switching from downlink reception to uplink transmission.

In another example, when the machine-readable instructions are executed by the processor 181, the following processing is executed:

receiving the first parameter value in one of the following message forms:

a system message, a UE-specific higher-layer signaling, cell-specific physical layer control information, UE-group-specific physical layer control information, and UE-specific physical layer control information.

In another example, when the machine-readable instructions are executed by the processor 181, the following processing is executed:

receiving a first bit identifier indicating the first parameter value sent by the network side equipment, and determining the first parameter value indicated by the network side equipment from the value set of the first parameter based on the first bit identifier.

In another example, when the machine-readable instructions are executed by the processor 181, the following processing is executed:

receiving the value set of the first parameter in one of the following message forms:

a system message, a UE-specific higher-layer signaling, cell-specific physical layer control information, UE-group-specific physical layer control information, and UE-specific physical layer control information.

In another example, when the machine-readable instructions are executed by the processor 181, the following processing is executed:

receiving a second bit identifier indicating the second parameter value sent by the network side equipment, and determining the second parameter value indicated by the network side equipment from the value set of second parameters based on the second bit identifier.

In an example, when the machine-readable instructions are executed by the processor 181, the following processing is further executed:

receiving the value set of second parameters in one of the following message forms:

a system message, a UE-specific higher-layer signaling, cell-specific physical layer control information, UE-group-specific physical layer control information, and UE-specific physical layer control information.

An example of the present disclosure also provides a computer-readable storage medium on which a computer program is stored a computer program, when the computer program is executed by the processor 181, the above functions of the user equipment 180 as shown in FIG. 18 are executed.

Specifically, the storage medium may be a general-purpose storage medium such as a removable disk, a hard disk, or the like, and when the computer program on the storage medium is executed, the above-described wireless resource scheduling method may be executed, so as to solve the problem that the current wireless resource scheduling method is poor in flexibility, and further achieve the effect of flexible resource scheduling.

In summary, in the above-described solutions provided by the examples of the present disclosure, the network side equipment determines the transmission length type of the first channel within the target time unit for the UE, notifies the UE of the transmission length type of the first channel within the target time unit, and performs data transmission with the UE within the target time unit based on the transmission length type of the first channel. By employing the solutions, the network side equipment does not need to directly indicate the specific time length of channel transmission to the UE, but only need to indicate, by a small number of bits, the transmission length type of a channel in a time unit, and the UE determines the transmission time length based on the transmission length type, which requires relatively low signaling cost.

In addition, in an example, the network side equipment and the UE may determine the transmission time length within the target time unit of one or more channels including the first channel based on the transmission length type of the first channel and one or both of the first parameter value and the second parameter value above-described, wherein the time unit here may be a sub-frame or a time slot. The transmission length type may be dynamically indicated by the downlink control information (DCI), and one or both of the first parameter value and the second parameter value may be specified by a protocol or may be indicated to the UE by means of a system message or the like, which therefore achieves flexible scheduling of the uplink channel and the downlink channel within one target time unit.

A computer program product of the wireless resource scheduling method provided by the examples of the present disclosure comprises a computer readable storage medium on which program codes are stored, the program codes comprise instructions for executing the methods described in the preceding method examples. As to the specific implementation, reference can be made to the method examples.

A person skilled in the art will clearly understand that for the convenience and brevity of description, as to the specific working process of the system and device described above, reference may be made to the corresponding process in the preceding method examples.

When implemented in the form of software functional units and sold or used as independent products, the functions can be stored on a computer readable storage medium. Based on such understanding, the substance of the technical solutions of the present disclosure, the part of the technical solutions of the present disclosure that makes contributions to the prior art, or part of the technical solutions can be embodied in the form of a software product, and the computer software product is stored on a storage medium and comprises some instructions for enabling one computer device (which can be a personal computer, a server, a network device or the like) to execute all or some of the steps of the methods in the examples of the present disclosure. The storage medium includes various mediums capable of storing program codes, such as a USB flash disk, a mobile hard disk, a read-only memory (ROM), a random access memory (RAM), a magnetic disk, or an optical disk.

The above descriptions are merely examples of the present disclosure, but the scope of protection of the present disclosure is not limited thereto. The changes or replacements that would readily be conceivable to a person skilled in the art within the technical scope disclosed by the present disclosure shall be covered by the scope of protection of the present disclosure. Therefore, the scope of protection of the present disclosure shall be determined by the scope of protection of the claims.

The invention claimed is:

1. A wireless resource scheduling method, comprising:
determining, by a network side equipment, a transmission length type of a first channel within a target time unit for user equipment (UE); and notifying the UE, by the network side equipment, of the transmission length type of the first channel within the target time unit, and performing data transmission with the UE within the target time unit based on the transmission length type of the first channel;

wherein the network side equipment performing data transmission with the UE within the target time unit based on the transmission length type of the first channel comprises:

determining, by the network side equipment, a transmission time length within the target time unit of one or more types of channels including the first channel based on the transmission length type of the first channel, a channel type of the first channel, and one or both of a first parameter value and a second parameter value; wherein the first parameter value indicates a minimum time length of an interval between a downlink signal and an immediately subsequent uplink signal, and the second parameter value indicates a minimum time length of downlink transmission within the target time unit, with the downlink transmission starting at the starting position of the target time unit; and performing, by the network side equipment, data transmission with the UE based on the transmission time length of the one or more types of channels, wherein the network side equipment determining a transmission time length within the target time unit of one or more types of channels comprises:

determining, if the first channel is a physical downlink shared channel (PDSCH), next time unit following the target time unit is for downlink, and the transmission length type of the PDSCH is long type, that within the target time unit, the transmission time length of the PDSCH=the length of the target time unit–the second parameter value–$\alpha1$, with $\alpha1$ being a constant greater than or equal to 0; wherein the transmission time length of the PDSCH of the long type is greater than the length of the target time unit/2;

determining, if the first channel is the PDSCH, the next time unit following the target time unit is for uplink, and the transmission length type of the PDSCH is the long type, that within the target time unit, the transmission time length of the PDSCH=the length of the target time unit–the first parameter value–the second parameter value–$\alpha1$;

determining, if the first channel is the physical downlink shared channel (PDSCH) and the transmission length type of the PDSCH is short type, that within the target time unit, the transmission time length of the PDSCH of the short type=⌊the length of the target time unit/$\beta$⌋–the second parameter value–$\alpha2$, and that within the target time unit, the transmission time length of a physical uplink control channel (PUCCH) of the short type=⌈the length of the target time unit/$\beta$⌉–the first parameter value–$\alpha2$; wherein $\beta$ is a constant greater than or equal to 2, and $\alpha2$ is a constant greater than or equal to 0;

determining, if the first channel is the PUCCH and the transmission length type of the PUCCH is the long type, that within the target time unit, the transmission time length of the PUCCH=the length of the target time unit–the first parameter value–the second parameter value–$\alpha1$, wherein the transmission time length of the PUCCH of the long type is greater than the length of the target time unit/2;

determining, if the first channel is a physical uplink shared channel (PUSCH) and the transmission length type of the PUSCH is the short type, that within the target time unit, the transmission time length of the PUSCH=⌈the length of the target time unit/$\beta$⌉–the first parameter value–$\alpha2$; and determining, if the first channel is the PUSCH and the transmission length type of the PUSCH is the long type, that within the target time unit, the transmission time length of the PUSCH=the length of the target time unit–the first parameter value–the second parameter value–$\alpha1$, with $\alpha1$ being a constant greater than or equal to 0; wherein the transmission time length of the PUSCH of the long type is greater than the length of the target time unit/2.

2. The wireless resource scheduling method according to claim 1, further comprising:

selecting, by the network side equipment, one value from a value set of first parameters as the first parameter value, and sending to the UE a first bit identifier indicating the selected first parameter value; and/or selecting, by the network side equipment, one value from a value set of second parameters as the second parameter value based on number of symbols required to be occupied for transmitting downlink control information (DCI) and/or number of symbols required to be occupied for transmitting downlink measurement reference signals, and sending to the UE a second bit identifier indicating the selected second parameter value.

3. The wireless resource scheduling method according to claim 1, wherein the network side equipment notifying the UE of the transmission length type of the first channel within the target time unit comprises:

sending, by the network side equipment, a third bit identifier to the UE by means of downlink control information (DCI), with the third bit identifier indicating the transmission length type of the first channel.

4. A network side equipment, comprising a processor, a non-transitory storage medium and a bus, a machine-readable instruction executable by the processor is stored in the non-transitory storage medium, the processor communicates with the non-transitory storage medium via the bus, and when the machine-readable instruction is executed by the processor, following processing is executed:

determining a transmission length type of a first channel within a target time unit for a UE; and notifying the UE of the transmission length type of the first channel within the target time unit, and performing data transmission with the UE unit based on the transmission length type of the first channel within the target time unit;

wherein as for the performing data transmission with the UE based on the transmission length type of the first channel, when the machine-readable instruction is executed by the processor, following processing is executed:

determining a transmission time length within the target time unit of one or more types of channels including the first channel based on the transmission length type of the first channel, a channel type of the first channel, and one or both of a first parameter value and a second parameter value; wherein the first parameter value indicates a minimum time length of an interval between a downlink signal and an immediately subsequent uplink signal; and the second parameter value indicates a minimum time length of downlink transmission within the target time unit, with the downlink transmission starting at a starting position of the target time unit; and performing data transmission with the UE based on the transmission time length of the one or more types of channels, wherein as for the determining a transmission time length within the target time unit of one or more types of channels based on the transmission length type of the first channel and one or both of a first parameter value and a second parameter value, when the machine-readable instruction is executed by the processor, following processing is executed:

determining, if the first channel is a physical downlink shared channel (PDSCH), next time unit following the target time unit is for downlink, and the transmission length type of the PDSCH is long type, that within the target time unit, the transmission time length of the PDSCH=the length of the target time unit−the second parameter value−α1, with α1 being a constant greater than or equal to 0; wherein the transmission time length of the PDSCH of the long type is greater than the length of the target time unit/2;

determining, if the first channel is the PDSCH, the next time unit following the target time unit is for uplink, and the transmission length type of the PDSCH is the long type, that within the target time unit, the transmission time length of the PDSCH=the length of the target time unit−the first parameter value−the second parameter value−α1;

determining, if the first channel is the physical downlink shared channel (PDSCH) and the transmission length type of the PDSCH is short type, that within the target time unit, the transmission time length of the PDSCH of the short type=⌊the length of the target time unit/β⌋−the second parameter value−α2, and that within the target time unit, the transmission time length of a physical uplink control channel (PUCCH) of the short type=⌈the length of the target time unit/β⌉−the first parameter value−α2; wherein β is a constant greater than or equal to 2, and α2 is a constant greater than or equal to 0;

determining, if the first channel is the PUCCH and the transmission length type of the PUCCH is the long type, that within the target time unit, the transmission time length of the PUCCH=the length of the target time unit−the first parameter value−the second parameter value−α1, wherein the transmission time length of the PUCCH of the long type is greater than the length of the target time unit/2;

determining, if the first channel is a physical uplink shared channel (PUSCH) and the transmission length type of the PUSCH is the short type, that within the target time unit, the transmission time length of the PUSCH=⌈the length of the target time unit/β⌉−the first parameter value−α2; and determining, if the first channel is the PUSCH and the transmission length type of the PUSCH is the long type, that within the target time unit, the transmission time length of the PUSCH=the length of the target time unit−the first parameter value−the second parameter value−α1, with α1 being a constant greater than or equal to 0; wherein the transmission time length of the PUSCH of the long type is greater than the length of the target time unit/2.

5. The network side equipment according to claim 4, wherein when the machine-readable instruction is executed by the processor, following processing is further executed:

selecting one value from a value set of first parameters as the first parameter value, and sending to the UE a first bit identifier indicating the selected first parameter value; and/or selecting one value from a value set of the second parameter as second parameters value based on number of symbols required to be occupied for transmitting downlink control information (DCI) and/or number of symbols required to be occupied for transmitting downlink measurement reference signals, and sending to the UE a second bit identifier indicating the selected second parameter value.

6. The network side equipment according to claim 4, wherein as for the notifying the UE of the transmission length type of the first channel within the target time unit, when the machine-readable instruction is executed by the processor, following processing is executed:

sending a third bit identifier to the UE by means of the downlink control information (DCI), with the third bit identifier indicating the transmission length type of the first channel.

7. A UE, comprising a processor, a non-transitory storage medium and a bus, a machine-readable instruction executable by the processor is stored in the non-transitory storage medium, the processor communicates with the non-transitory storage medium via the bus, and when the machine-readable instruction is executed by the processor, following processing is executed:

receiving a transmission length type of a first channel within a target time unit, with the transmission length type notified by a network side equipment; and performing data transmission with the network side equipment within the target time unit based on the transmission length type of the first channel;

wherein as for the performing data transmission with the network side equipment within the target time unit based on the transmission length type of the first channel, when the machine-readable instruction is executed by the processor, following processing is executed:

determining a transmission time length within the target time unit of one or more types of channels including the first channel based on the transmission length type of the first channel, a channel type of the first channel, and one or both of a first parameter value and a second parameter value; wherein the first parameter value indicates a minimum time length of an interval between a downlink signal and an immediately subsequent uplink signal; and the second parameter value indicates a minimum time length of downlink transmission within the target time unit, with the downlink transmission starting at a starting position of the target time unit; and performing data transmission with the network side equipment based on the transmission time length of the one or more types of channels, wherein as for the determining a transmission time length within the target time unit of one or more types of channels including the first channel based on the transmission length type of the first channel and one or both of a first parameter value and a second parameter value, when the machine-readable instruction is executed by the processor, following processing is executed:

determining, if the first channel is a physical downlink shared channel (PDSCH), next time unit following the target time unit is for downlink, and the transmission length type of the PDSCH is long type, that within the target time unit, the transmission time length of the PDSCH=the length of the target time unit−the second parameter value−α1, with α1 being a constant greater than or equal to 0; wherein the transmission time length of the PDSCH of the long type is greater than the length of the target time unit/2;

determining, if the first channel is the PDSCH, the next time unit following the target time unit is for uplink, and the transmission length type of the PDSCH is the long type, that within the target time unit, the transmission time length of the PDSCH=the length of the target time unit−the first parameter value−the second parameter value−α1;

determining, if the first channel is the physical downlink shared channel (PDSCH) and the transmission length type of the PDSCH is short type, that within the target time unit, the transmission time length of the PDSCH of the short type=⌊the length of the target time unit/β⌋−the second parameter value−α2, and that within the target time unit, the transmission time length of a physical uplink control channel (PUCCH) of the short type=⌈the length of the target time unit/β⌉−the first parameter value−α2; wherein β is a constant greater than or equal to 2, and α2 is a constant greater than or equal to 0;

determining, if the first channel is the PUCCH and the transmission length type of the PUCCH is the long type, that within the target time unit, the transmission time length of the PUCCH=the length of the target time unit−the first parameter value−the second parameter value−α1, wherein the transmission time length of the PUCCH of the long type is greater than the length of the target time unit/2;

determining, if the first channel is a physical uplink shared channel (PUSCH) and the transmission length type of the PUSCH is the short type, that within the target time unit, the transmission time length of the PUSCH=⌈the length of the target time unit/β⌉−the first parameter value−α2; and determining, if the first channel is the PUSCH and the transmission length type of the PUSCH is the long type, that within the target time unit, the transmission time length of the PUSCH=the length of the target time unit−the first parameter value−the second parameter value−α1, with α1 being a constant greater than or equal to 0; wherein the transmission time length of the PUSCH of the long type is greater than the length of the target time unit/2.

8. The UE according to claim 7, wherein when the machine-readable instruction is executed by the processor, following processing is further executed:

receiving a first bit identifier indicating the first parameter value and sent by the network side equipment, and determining the first parameter value indicated by the network side equipment from a value set of first parameters based on the first bit identifier; and/or receiving, by the UE, a second bit identifier indicating the second parameter value and sent by the network side equipment, and determining the second parameter value indicated by the network side equipment from a value set of second parameters based on the second bit identifier.

9. The UE according to claim 7, wherein as for the receiving a transmission length type of a first channel within a target time unit with the transmission length type notified by a network side equipment, when the machine-readable instruction is executed by the processor, following processing is executed:

receiving a third bit identifier indicating the transmission length type of the first channel, with the third bit identifier sent by the network side equipment by means of downlink control information (DCI).

* * * * *